United States Patent
Tamaoki et al.

(10) Patent No.: US 10,183,220 B2
(45) Date of Patent: Jan. 22, 2019

(54) IMAGE GENERATION DEVICE AND IMAGE GENERATION METHOD

(71) Applicant: BANDAI NAMCO ENTERTAINMENT INC., Tokyo (JP)

(72) Inventors: Jun Tamaoki, Shinagawa-ku (JP); Kazumasa Koseki, Yokohama (JP); Haruyoshi Yamamoto, Ota-ku (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/073,046

(22) Filed: Mar. 17, 2016

(65) Prior Publication Data

US 2016/0287994 A1 Oct. 6, 2016

(30) Foreign Application Priority Data

Mar. 31, 2015 (JP) .................. 2015-073080

(51) Int. Cl.
| | |
|---|---|
| A63F 9/24 | (2006.01) |
| A63F 13/537 | (2014.01) |
| A63F 13/26 | (2014.01) |
| A63F 13/211 | (2014.01) |
| A63F 13/42 | (2014.01) |
| A63F 13/212 | (2014.01) |

(52) U.S. Cl.
CPC .......... *A63F 13/537* (2014.09); *A63F 13/211* (2014.09); *A63F 13/212* (2014.09); *A63F 13/26* (2014.09); *A63F 13/42* (2014.09)

(58) Field of Classification Search
CPC ............ A63F 2300/8082; A63F 13/525; A63F 13/53; A63F 13/537
See application file for complete search history.

(56) References Cited

U.S. PATENT DOCUMENTS

| | | | | |
|---|---|---|---|---|
| 6,210,273 | B1* | 4/2001 | Matsuno ................. | A63F 13/10 463/31 |
| 6,559,863 | B1* | 5/2003 | Megiddo ............. | H04L 12/1827 348/14.08 |
| 2004/0193413 | A1* | 9/2004 | Wilson .................... | G06F 3/017 704/243 |
| 2007/0060231 | A1* | 3/2007 | Neveu ..................... | A63F 13/06 463/5 |
| 2012/0295708 | A1* | 11/2012 | Hernandez-Abrego ..................... A63F 13/424 463/36 |

(Continued)

FOREIGN PATENT DOCUMENTS

| | | |
|---|---|---|
| JP | 2001-162041 A | 6/2001 |
| JP | 2004-208894 A | 7/2004 |

*Primary Examiner* — Steve Rowland
(74) *Attorney, Agent, or Firm* — Oliff PLC

(57) ABSTRACT

An image generation device includes a processor including hardware. The processor is configured to implement a reception process that receives a command selected by a player from a plurality of commands, a game process that includes a process that implements the effect of the received command, and a display process that displays a game image based on the results of the game process. The processor is configured to implement the game process that includes a process that implements the effect of the command that corresponds to information about a character that is the target of game play performed by the player and viewpoint information about the player.

20 Claims, 23 Drawing Sheets

(56) References Cited

U.S. PATENT DOCUMENTS

| | | | |
|---|---|---|---|
| 2013/0316821 A1* | 11/2013 | Summons | A63F 13/02 463/31 |
| 2014/0160432 A1* | 6/2014 | Brown, Jr. | G06K 9/0061 351/208 |
| 2015/0193018 A1* | 7/2015 | Venable | G06F 3/0346 345/158 |

* cited by examiner

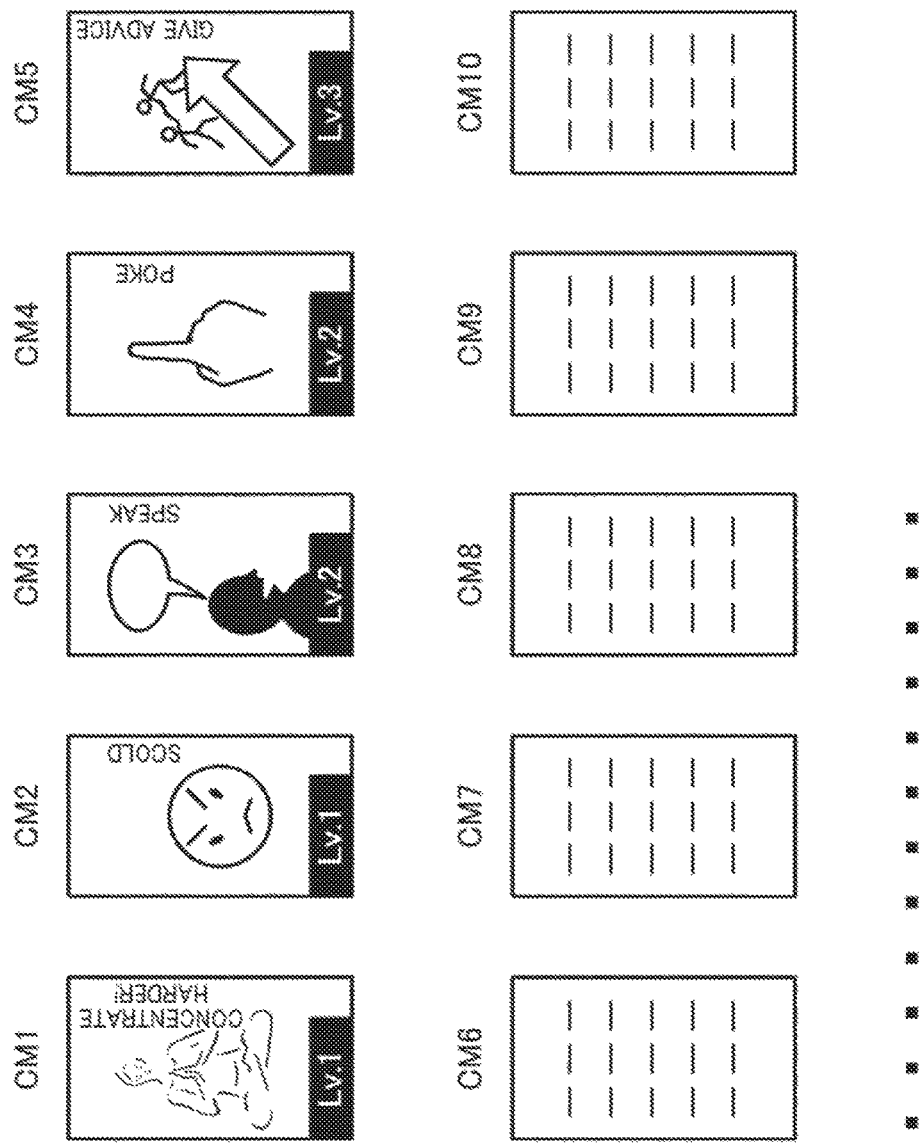

| DISTANCE | EFFECT CHANGE RATIO |
|---|---|
| LC1 | 1.0 × PR |
| LC2(<LC1) | 1.1 × PR |
| LC3(<LC2) | 1.3 × PR |
| ⋮ | ⋮ |

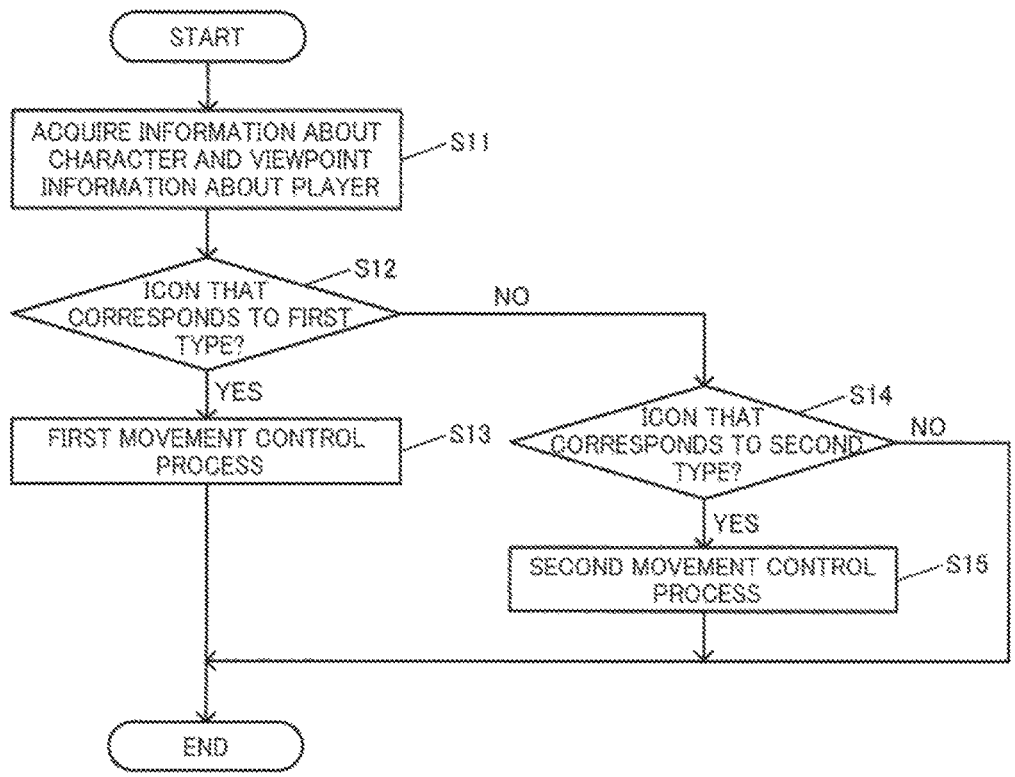

1

IMAGE GENERATION DEVICE AND IMAGE GENERATION METHOD

Japanese Patent Application No. 2015-073080 filed on Mar. 31, 2015, is hereby incorporated by reference in its entirety.

BACKGROUND

The present invention relates to an image generation device, an image generation method, and the like.

A game that is designed so that the player can enjoy quasi-love or the like while having conversation or the like with a female character or the like that appears within the screen is known. The player of such a communication game (love simulation game) that utilizes a female character tries to make a more favorable impression on the character (i.e., improve the relationship with the character) by making various actions (e.g., speaks to the character, gives advice to the character, or has conversation with the character), and growing his/her parameters relating to study, sports, and the like by selecting an arbitrary command assigned to each icon displayed within the screen. For example, JP-A-2001-162041 and JP-A-2004-208894 disclose an image generation device that implements such a game.

However, a known image generation device that implements the above type of game does not take account of the relationship between the character and the player when the player selects the desired command. Therefore, the effect achieved by the command is identical between the case where the command has been selected in a slate in which the player (viewpoint) is situated close to the character, and the case where the command has been selected in a state in which the player is situated away from the character, for example. Specifically, a known image generation device has a problem in that the relationship between the character and the player is not sufficiently reflected in the implementation of the effect of the command.

SUMMARY

According to one aspect of the invention, there is provided an image generation device comprising: a processor comprising hardware, the processor being configured to implement: a reception process that receives a command that has been selected by a player from a plurality of commands; a game process that includes a process that implements an effect of the received command, and a display process that displays a game image based on results of the game process, wherein the processor is configured to implement the game process that includes a process that implements the effect of the command that corresponds to information about a character that is a target of game play performed by the player and viewpoint information about the player.

According to another aspect of the invention, there is provided an image generation device comprising: a processor comprising hardware, the processor being configured to implement: a reception process that receives a command that has been selected by a player using touch panel operation from a plurality of commands; a game process that includes a process that implements an effect of the received command; and a display process that displays a game image based on results of the game process, wherein the processor is configured to implement the game process that includes a process that implements the effect of the command that corresponds to information about a character that is a target of game play performed by the player and viewpoint information about the player.

According to another aspect of the invention, there is provided an image generation device comprising: a processor comprising hardware, and a head-mounted display, the processor being configured to implement: a reception process that receives a command that has been selected by a player from a plurality of commands; a game process that includes a process that implements an effect of the received command; and a display process that displays a game image based on results of the game process, the game image being displayed on the head-mounted display, wherein the processor is configured to implement the game process that includes a process that implements the effect of the command that corresponds to information about a character that is a target of game play performed by the player and viewpoint information about the player.

According to another aspect of the invention, there is provided an image generation method comprising: performing a reception process that receives a command that has been selected by a player from a plurality of commands; performing a game process that includes a process that implements an effect of the received command; and performing a display process that displays a game image based on results of the game process, wherein the performing of the game process includes a process that implements the effect of the command that corresponds to information about a character that is a target of game play performed by the player and viewpoint information about the player.

According to another aspect of the invention, there is provided an image generation method comprising: performing a reception process that receives a command that has been selected by a player using touch panel operation from a plurality of commands; performing a game process that includes a process that implements an effect of the received command; and performing a display process that displays a game image based on results of the game process, wherein the performing of the game process includes a process that implements the effect of the command that corresponds to information about a character that is a target of game play performed by the player and viewpoint information about the player.

BRIEF DESCRIPTION OF THE DRAWINGS

FIG. 3 is a view illustrating an imaging section and the like.

FIG. 4 is a view illustrating a plurality of commands used in a game.

FIGS. 17A and 17B are views illustrating an icon movement control process.

DESCRIPTION OF EXEMPLARY EMBODIMENTS

Figure 1:
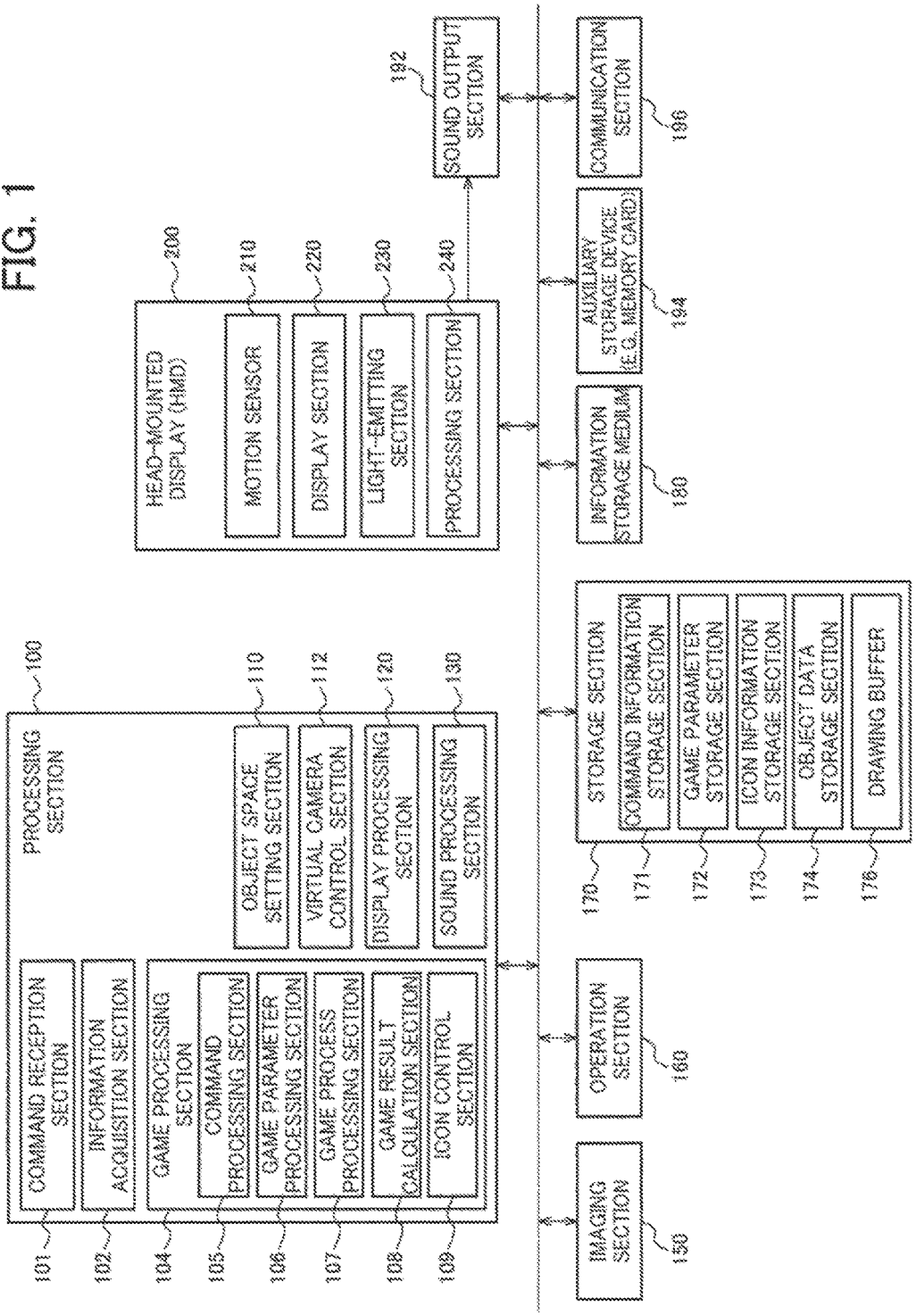
FIG. 1 illustrates a configuration example of an image generation device according to one embodiment of the invention.

Several aspects of the invention may provide an image generation device, an image generation method, and the like that can implement a process that implements the effect of a command in which the relationship between the character and the player is reflected.

According to one embodiment of the invention, there is provided an image generation device comprising: a processor comprising hardware, the processor being configured to implement: a reception process that receives a command that has been selected by a player from a plurality of commands; a game process that includes a process that implements an effect of the received command; and a display process that displays a game image based on results of the game process, wherein the processor is configured to implement the game process that includes a process that implements the effect of the command that corresponds to information about a character that is a target of game play performed by the player and viewpoint information about the player.

According to one embodiment of the invention, when the player has selected the desired command from a plurality of commands, the selected command is received, and a command process that implements the effect of the command is performed. The command process implements the effect of the command that corresponds to the information atom the character and the viewpoint information about the player. For example, the command process implements the effect of the command based on information that is set by the information about the character and the viewpoint information about the player. This makes it possible to implement a process that implements the effect of the command in which the relationship between the character and the player is reflected, and implement a novel game, for example.

In the image generation device, the processor may be configured to implement the game process that includes a process that implements the effect of the command that corresponds to positional relationship information about the player and the character.

This makes it possible to implement the effect of the command in which the positional relationship information about the player and the character is reflected, and change the effect of the command corresponding to the positional relationship information, for example.

In the image generation device, the processor may be configured to implement the game process that includes a process that implements the effect of the command that corresponds to line-of-sight relationship information, the line-of-sight relationship information representing the relationship between the line of sight of the player and the character.

This makes it possible to implement the effect of the command in which the line-of-sight relationship information that represents the relationship between the line of sight of live player and the character is reflected, and change the effect of the command corresponding to the line-of-sight relationship information, for example.

In the image generation device, the processor may be configured to implement the game process that includes a process that implements the effect of the command that corresponds to gaze information about the player.

This makes it possible to implement the effect of the command in which the gaze information about the player is reflected, and change the effect of the command corresponding to the gaze information, for example.

In the image generation device, the processor is configured to implement the game process that includes a process that implements the effect of the command that corresponds to the gaze information that is at least one of gaze target part information, gaze presence absence information, gaze time information, and gaze distance information, the gaze target part information being information about a part of the character at which the player gazes, the gaze presence/absence information being information that represents whether or not the player gazes at the character, the gaze time information representing a time in which the player gazes at the character, and the gaze distance information representing a distance between the player and the character when the player gazes at the character.

According to this configuration, it is possible to implement the effect of the command that corresponds to whether or not the player gazes at the character, the part of the character at which the player gazes, the gaze time in which the player gazes at the character, or the gaze distance between the player and the character when the player gazes at the character, and perform the game process.

In the image generation device, the information about the character may be at least one of position information, direction information, game parameter information, part information, pose information, and type information about the character, and the viewpoint information may be at least one of viewpoint position information, line-of-sight direction information, and virtual camera attribute information about the player.

This makes it possible to implement the effect of the command that corresponds to the information about the character that is at least one of the position information, the direction information, the game parameter information, the part information, the pose information, and the type information about the character, and the viewpoint information that is at least one of the viewpoint position information, the line-of-sight direction information, and the virtual camera attribute information about the player, and perform the game process.

In the image generation device, the processor may be configured to implement the game process that includes a process that changes at least one of the degree of the effect of the command and the contents of the effect of the command corresponding to the information about the character and the viewpoint information about the player.

According to this configuration, the degree of the effect of the command or the contents of the effect of the command change corresponding to the relationship between the character and the player, or information (e.g., positional relationship information, line-of-sight relationship information, or gaze information) that is calculated from the information about the character and the viewpoint information about the player, for example. This makes it possible to allow the player to experience virtual reality in an improved manner, for example.

In the image generation device, the processor may be configured to implement the game process that includes a process that implements the effect of a command that differs from the command selected by the player corresponding to the information about the character and the viewpoint information about the player.

According to this configuration, the effect of a command that differs from the command selected by the player is implemented corresponding to the relationship between the character and the player, or information (e.g., positional relationship information, line-of-sight relationship information, or gaze information) that is calculated from the information about the character and the viewpoint information about the player, for example. This makes it possible to implement a wide variety of processes that implement the effect of the command.

In the image generation device, the processor may be configured to implement the game process that includes a process that changes the effect of the command that has been implemented, when the information about the character or the viewpoint information about the player has changed within a given period after the implementation of the effect of the command corresponding to the information about the character and the viewpoint information about the player.

This makes it possible to implement the effect of the command that corresponds to the information about the character and the viewpoint information about the player, and change the effect of the command that has been implemented, when the information about the character or the viewpoint information about the player has changed due to the implementation of the effect of the command. Therefore, it is possible to implement the game process that further reflects the relationship between the player and the character.

In the image generation device, the processor may be configured to implement the game process that includes a process that implements the effect of the command based on the information about the character, the viewpoint information about the player, and a random element parameter.

According to this configuration, it is possible to suppress or reduce the occurrence of a situation in which the effect of the command that is implemented becomes uniform.

In the image generation device, the processor may be configured to implement the display process that includes a process that displays an icon that corresponds to the command, and changes a display state of the icon that corresponds to the command when at least one of the degree of the effect of the command and the contents of the effect of the command has changed.

According to this configuration, it is possible to allow the player to visually determine that the degree of the effect of the command or the contents of the effect of the command have changed by changing the display state of the icon.

In the image generation device, the processor may be configured to implement the display process that includes a process that displays an icon that corresponds to the command, and the processor may be configured to implement the game process that includes a process that controls movement of the icon corresponding to at least one of the information about the character and the viewpoint information about the player.

According to this configuration, the movement of the icon that corresponds to the command is controlled corresponding to the information about the character or the viewpoint information about the player. This makes it possible to implement an icon movement control process that reflects the relationship between the character and the player, for example.

In the image generation device, the processor may be configured to implement the display process that includes a process that displays a plurality of icons that respectively correspond to a plurality of commands, and the processor may be configured to implement the game process that includes a process that performs a first movement control process on an icon among the plurality of icons that corresponds to a first type, and performs a second movement control process on an icon among the plurality of icons that corresponds to a second type, the second movement control process differing from the first movement control process.

According to this configuration, it is possible to perform different movement control processes on the icon that corresponds to the first type and the icon that corresponds to the second type, and implement various movement control processes on the icon that corresponds to the command.

In the image generation device, the processor may be configured to implement the display process that includes a process that displays a plurality of icons that respectively correspond to a plurality of commands, and the processor may be configured to implement the game process that includes a process that performs different movement control processes on a first icon, a second icon, or a third icon and an icon other than the first to third icons, the first icon, the first icon corresponding to the command of which the effect is being implemented, or the second icon corresponding to the command of which the effect has changed, or the third icon relating to a game parameter of the character, and an icon among the plurality of icons other than these icons.

According to this configuration, it is possible to perform a specific movement control process on an important icon (e.g., an icon that corresponds to the command of which the effect is being implemented, the icon that corresponds to the command of which the effect has changed, or the icon that relates to the game parameter of the character).

In the image generation device, the processor may be configured to implement the display process that includes a process that displays an icon so that the icon that corresponds to the command is displayed at a specific position within a display screen even when the viewpoint information about the player has changed.

According to this configuration, the icon that corresponds to the command is displayed (e.g., fixed) at a specific position within the display screen even when the viewpoint information about the player has changed in various ways. Therefore, the player can select the icon in a state in which the player knows that the icon is displayed at the specific position when selecting the icon in order to implement the effect of the command, and it is possible to provide a command input interface that is convenient to the player.

In the image generation device, the processor may be configured to implement the display process that includes a process that does not display the icon that corresponds to the command when it is determined that the character is not situated within the field-of-view range of the player.

According to this configuration, since the icon that corresponds to the command is not displayed when it has been determined that the character is not situated within the field-of-view range of the player (i.e., when it is not likely that it is necessary to implement the effect of the command), it is possible to suppress or reduce the occurrence of a situation in which the field of view of the player is blocked by the icon.

According to another embodiment of the invention, there is provided an image generation device comprising: a processor comprising hardware, the processor being configured to implement: a reception process that receives a command that has been selected by a player using touch panel operation from a plurality of commands; a game process that includes a process that implements an effect of the received command; and a display process that displays a game image based on results of the game process, wherein the processor is configured to implement the game process that includes a process that implements the effect of the command that corresponds to information about a character that is a target of game play performed by the player and viewpoint information about the player.

According to another embodiment of the invention, there is provided an image generation device comprising: a processor comprising hardware, and a head-mounted display, the processor being configured to implement: a reception process that receives a command that has been selected by a player from a plurality of commands; a game process that includes a process that implements an effect of the received command; and a display process that displays a game image based on results of the game process, the game image being displayed on the head-mounted display, wherein the processor is configured to implement the game process that includes a process that implements the effect of the command that corresponds to information about a character that is a target of game play performed by the player and viewpoint information about the player.

According to another embodiment of the invention, there is provided an image generation method comprising: performing a reception process that receives a command that has been selected by a player from a plurality of commands; performing a game process that includes a process that implements an effect of the received command; and performing a display process that displays a game image based on results of the game process, wherein the performing of the game process includes a process that implements the effect of the command that corresponds to information about a character that is a target of game play performed by the player and viewpoint information about the player.

According to another embodiment of the invention, there is provided an image generation method comprising: performing a reception process that receives a command that has been selected by a player using touch panel operation from a plurality of commands; performing a game process that includes a process that implements an effect of the received command; and performing a display process that displays a game image based on results of the game process, wherein the performing of the game process includes a process that implements the effect of the command that corresponds to information about a character that is a target of game play performed by the player and viewpoint information about the player.

Exemplary embodiments of the invention are described below. Note that the following exemplary embodiments do not in any way limit the scope of the invention laid out in the claims. Note also that all of the elements described below in connection with the exemplary embodiments should not necessarily be taken as essential elements of the invention.

1. Configuration

FIG. 1 illustrates an example of a block diagram of an image generation device (game system, game device, or server system) according to one embodiment of the invention. Note that the configuration of the game system according to one embodiment of the invention is not limited to the configuration illustrated in FIG. 1. Various modifications may be made, such as omitting some of the elements (sections), or adding other elements.

An imaging section 150 includes one camera or a plurality of cameras. Each camera includes an optical system (e.g., lens (wide-angle lens)) and an image sensor (e.g., CCD or CMOS sensor). The imaging section 150 may include one microphone or a plurality of microphones. It is possible to detect motion information (motion information about each part, or skeleton information) about the player, and perform a recognition process (e.g., face recognition process) on the player by utilizing the imaging section 150. When the imaging section 150 includes a plurality of cameras, it is possible to determine the positional relationship in the depth direction between two players who play the game in front of the imaging section 150, for example. When the imaging section 150 includes a plurality of microphones, it is possible to detect the direction of the sound source, for example. For example, when the imaging section 150 includes a plurality of cameras and a plurality of microphones, it is possible to implement a game that allows the player to intuitively play the game by utilizing the motion, the voice, or the like of the player as operation information.

An operation section 160 allows the player to input operation data. The function of the operation section 160 may be implemented by a direction key, an analog stick, an operation button, a lever, a touch panel display, or the like. A vibration mechanism (e.g., vibration motor) that informs the player of information may be provided to the operation section 160.

A storage section 170 serves as a work area for a processing section 100, a communication section 196, and the like. The function of the storage section 170 may be implemented by a RAM (DRAM or VRAM) or the like. A game program and game data that is necessary for the execution of the game program are stored in the storage section 170.

An information storage medium 180 (computer-readable medium) stores a program, data, and the like. The function of the information storage medium 180 may be implemented by an optical disk (DVD or CD), a hard disk drive (HDD), a memory (e.g., ROM), or the like. The processing section 100 performs various processes according to one embodiment of the invention based on a program (data) stored in the information storage medium 180. Specifically, a program that causes a computer (i.e., a device that includes an operation section, a processing section, a storage section, and an output section) to function as each section according to one embodiment of the invention (i.e., a program that causes a computer to execute the process of each section) is stored in the information storage medium 180.

A head-mounted display 200 (hereinafter appropriately referred to as "HMD") is a device that is worn on the head of the player, and displays an image in front of the eyes of the player. The head-mounted display 200 includes a motion sensor 210 and a display section 220. The head-mounted display 200 may also include a light-emitting section 230 and a processing section 240.

The motion sensor 210 is implemented by an acceleration sensor, a gyro sensor, or the like. For example, when the motion sensor 210 includes an acceleration sensor and a gyro sensor, it is possible to detect the rotational motion of the head (HMD) of the player around an X-axis, a Y-axis, and a Z-axis. For example, it is possible to detect the rotation angle, the angular velocity, and the like around the X-axis, the Y-axis, and the Z-axis. The light-emitting section 230 is implemented by LED 231 to 236 (light-emitting devices) (see FIG. 2) (described later), or the like. For example, it is possible to detect the movement of the head (HMD) of the player in the forward direction, the backward direction, the leftward direction, the rightward direction, the upward direction, and the downward direction by capturing light emitted from the LED 231, 232, 233, and 234 provided on the front side of the HMD 200, and the LED 235 and 236 provided on the back side of the HMD 200 using the imaging section 150. Specifically, it is possible to acquire position information about the head (HMD) of the player in a three-dimensional space.

The display section 220 of the HMD 200 may be implemented by a liquid crystal display (LCD), an organic EL display, or the like. For example, the HMD 200 includes a first display that is positioned in front of the left eye of the player and a second display that is positioned in front of the right eye of the player as the display section 220 so that stereoscopic display or the like can be implemented. When implementing stereoscopic display, a left-eye image and a right-eye image that implement parallax are generated, and respectively displayed on the first display and the second display, for example. Note that the display section 220 may not be a display section provided to the HMD 200. The display section 220 may be a display section (e.g., TV) of a consumer game device, a display section of an arcade game device, a display section of an information processing device (PC), or the like.

The processing section 230 of the HMD 200 performs various processes necessary for the HMD 200. For example, the processing section 230 performs a process that causes the motion sensor 210 to detect sensor information, a display control process that controls the display of the display section 220, and the like. The processing section 230 performs a three-dimensional sound (stereophonic) process to implement the three-dimensional reproduction of the direction, the distance, and the expansion of the sound. Specifically, the processing section 230 performs a process that controls the sound field in a three-dimensional space. The resulting sound is output to the sound output section 192 (that is implemented by a headphone or the like) through a headphone terminal provided to the HMD 200.

The sound output section 192 outputs a sound generated according to one embodiment of the invention. The function of the sound output section 192 may be implemented by a headphone, a speaker provided to a TV or an audio device, or the like.

An auxiliary storage device 194 (auxiliary memory or secondary memory) is a storage device that is used to supplement the capacity of the storage section 170. The auxiliary storage device 194 may be implemented by a memory card such as an SD memory card or a multimedia card, or the like.

The communication section 196 communicates with the outside (e.g., another device) through a cable or wireless network. The function of the communication section 196 may be implemented by hardware (e.g., communication ASIC or communication processor) or communication firmware.

Note that a program (data) that causes a computer to function as each section according to one embodiment of the invention may be distributed to the information storage medium 180 (or either or both of the storage section 170 and the auxiliary storage device 194) from an information storage medium included in a server (host device) through a network and the communication section 196. Use of the information storage medium included in the server (host device) is intended to be included within the scope of the invention.

The processing section 100 (processor) performs a game process, a display process, a sound process, and the like based on operation information from the operation section 160 and the HMD 200, a program, and the like. The processing section 100 performs various processes using the storage section 170 as a work area. The function of the processing section 100 may be implemented by hardware such as a processor (e.g., CPU or GPU) or an ASIC (e.g., gate array), or a program.

Each process (each function) according to one embodiment of the invention that is performed by each section of the processing section 100 may be implemented by a processor (i.e., a processor including hardware). For example, each process according to one embodiment of the invention may be implemented by a memory that stores information (e.g., program), and a processor that includes hardware, and operates based on the information stored in the memory. The processor may implement the function of each section by individual hardware, or may implement the function of each section by integrated hardware, for example. The processor may be a central processing unit (CPU), for example. Note that the processor is not limited to a CPU. Various other processors such as a graphics processing unit (GPU) or a digital processing unit (DSP) may also be used. The processor may be a hardware circuit that includes an ASIC. The memory (storage section 170) may be a semiconductor memory (e.g., SRAM or DRAM), or may be a register. The memory may be a magnetic storage device such as a hard disk drive (HDD), or may be an optical storage device such as an optical disk device. For example, the memory stores a computer-readable instruction, and the process (function) of each section of the processing section 100 is implemented by causing the processor to execute the instruction. The instruction may be an instruction set that is included in a program, or may be an instruction that causes a hardware circuit included in the processor to operate.

The processing section 100 includes a command reception section 101, an information acquisition section 102, a game processing section 104, an object space setting section 110, a virtual camera control section 112, a display processing section 120, and a sound processing section 130. Note that various modifications may be made, such as omitting some of these elements (sections), or providing an additional element.

The command reception section 101 performs a reception process that receives a command selected by the player. For example, the command reception section 101 receives a command that has been selected by the player using touch panel operation from a plurality of commands.

The information acquisition section 102 acquires various types of information necessary for the process performed by the processing section 100. Specifically, the information acquisition section 102 performs a reception process that receives various types of information necessary for the process performed by the processing section 100. For example, the information acquisition section 102 acquires operation information input by the player (operation information about the player) from the operation section 160 and the HMD 200.

The game processing section 104 performs a game process (game calculations). The game process includes a process that starts the game when game start conditions have been satisfied, a process that proceeds with the game, a process that calculates the game result, a process that terminates the game when game termination conditions have been satisfied, and the like. The game processing section 104 includes a command processing section 105, a game parameter processing section 106, a game process processing section 107, a game result calculation section 108, and an icon control section 109. The details of the game processing section 104 are described later.

The object space setting section 110 performs a process that sets an object space in which a plurality of objects are disposed. For example, the object space setting section 110 performs a process that disposes an object (i.e., an object formed by a primitive surface such as a polygon, a free-form surface, or a subdivision surface) that represents a display object such as a character (e.g., human, animal, or robot), a map (geographical features), a building, a course (road), a tree, a wall, or a water surface in the object space. Specifically, the object space setting section 110 determines the position and the rotation angle (synonymous with orientation or direction) of the object in a world coordinate system, and disposes the object of the determined position (X, Y, Z) and the determined rotation angle (rotation angles around X, Y, and Z axes). More specifically, an object data storage section 174 included in the storage section 170 stores object data (e.g., the position, rotation angle, moving speed, and moving direction of the object (part object)) and an object number in a linked manner. The object space setting section 110 performs a process that updates the object data every frame, for example.

The virtual camera control section 112 performs a control process that controls a virtual camera (viewpoint or reference virtual camera) for generating an image viewed from a given (arbitrary) viewpoint in the object space. Specifically, the virtual camera control section 112 performs a process that controls the position (X, Y, Z) or the rotation angle (rotation angles around X, Y, and Z axes) of the virtual camera (i.e., controls the viewpoint position, the line-of-sight direction, or the angle of view). The virtual camera corresponds to the viewpoint of the player.

The display processing section 120 performs a display process that displays a game image. For example, the display processing section 120 performs a drawing process based on the results of various processes (game process and simulation process) performed by the processing section 100 to generate an image, and displays the generated image on the display section 220. Specifically, the display processing section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or alpha-value) based on the results of the geometric process. The display processing section 120 draws the object (one or more primitive surfaces) subjected to perspective transformation in a drawing buffer 176 (i.e., a buffer (e.g., frame buffer or work buffer) that can store image information on a pixel basis) based on the drawing data (primitive surface data). The display processing section 120 thus generates an image viewed from the virtual camera (given viewpoint) in the object space. Note that the drawing process performed by the display processing section 120 may be implemented by a vertex shader process, a pixel shader process, or the like.

The sound processing section 130 performs a sound process based on the results of various processes performed by the processing section 100. Specifically, the sound processing section 130 generates a game sound (e.g., background music (BGM), effect sound, or voice), and outputs the game sound from the sound output section 192. Note that pan (e.g., three-dimensional sound process) of the sound process performed by the sound processing section 130 may be implemented by the processing section 240 of the HMD 200.

As illustrated in FIG. 1, the image generation device according to one embodiment of the invention includes the command reception section 101, the game processing section 104, and the display processing section 120.

The command reception section 101 performs a reception process that receives a command that has been selected by the player from a plurality of commands. For example, information about N commands that can be selected by the player is stored in a command information storage section 171. For example, M (M<N) commands are selected from the N commands either automatically or by the player to form a command set that is referred to as "deck". The player selects the desired command from the M commands during game play. The command reception section 101 receives the selected command as the implementation target command.

The game processing section 104 performs a process that implements the effect of the received command as the game process. For example, the effect of each command is stored in the command information storage section 171 as command information in which the effect of each command is linked to each command. The game processing section 104 performs a process that implements the effect linked to the command selected by the player.

The game processing section 104 performs the game process such as a process that calculates a game parameter, a process that proceeds with the game, a process that calculates the game result, and a control process that controls an icon that corresponds to the command based on the results of implementation of the effect of the command. The game parameter processing section 106 performs the process that calculates the game parameter, the game process processing section 107 performs the process that proceeds with the game, and the game result calculation section 108 performs the process that calculates the game result. The icon control section 109 performs the control process (e.g., movement control process and display control process) that controls the icon. Information (e.g., value of game parameter) about the game parameter calculated by the game parameter processing section 106 is stored in a game parameter storage section 172, and information (e.g., image of icon) about the icon controlled by the control section 109 is stored in an icon information storage section 173.

More specifically, the game processing section 104 (game parameter processing section) performs a calculation process that increases or decreases the value of the game parameter. The game processing section 104 performs the game process (e.g., a process that controls the motion (action) of the character, a story branch process, and a process that generates a game event) based on the game parameter subjected to the calculation process. For example, the game processing section 104 performs the game process that implements a story in which the character (i.e., the target of game play performed by the player) and the player take part.

The display processing section 120 performs the display process that displays the game image based on the results of the game process. For example, the display processing section 120 performs a process that displays the game image that corresponds to the game parameter calculation results, the results of the game process, the game result calculation results, and the results of the icon control process on the display section 220. The sound processing section 130 performs a process that outputs the game sound (e.g., BGM, effect sound, or sound) from the sound output section 192 based on the results of the game process.

In one embodiment of the invention, the game processing section 104 performs a process that implements the effect of the command that corresponds to information about the character (i.e., the target of game play performed by the player) and viewpoint information about the player. For example, the game processing section 104 performs a process that implements the effect of the command that corresponds to information (e.g., positional relationship information, line-of-sight relationship information, or gaze information) that is set (determined) by the information about the character and the viewpoint information about the player.

More specifically, the game processing section 104 performs a process that changes at least one of the degree of the effect of the command and the contents of the effect of the command corresponding to the information about the character and the viewpoint information about the player. For example, the game processing section 104 performs the process that implements the effect of the command so that at least one of the degree of the effect of the command and the contents of the effect of the command is changed when the information (e.g., positional relationship information, line-of-sight relationship information, or gaze information) that is set (determined) by the information about the character and the viewpoint information about the player has changed.

The game processing section 104 may perform a process that implements the effect of a command that differs from the command selected by the player corresponding to the information about the character and the viewpoint information about the player. Specifically, the game processing section 104 may implement the effect of a command that differs from the command selected by the player corresponding to the information that is set by the information about the character and the viewpoint information about the player.

The information about the character is at least one of position information, direction information, game parameter information, part information, pose information, and type information about the character, for example. The position information about the character is information about a representative position of the character, for example. The information about the representative position of the character may be information about the position of the character that corresponds to a specific part (e.g., waist, trunk, or head), position information about the viewpoint of the character, or the like. The direction information about the character is information about the facing direction or the line-of-sight direction, of the character, for example.

The character is a game play element that appears in the game. For example, the character represents a human, an animal, a robot, a moving object, or the like in the real world, and is displayed within the game image as an object.

For example, the character that is the target of game play performed by the player is a character with which the player performs game play (a character with which the player plays the game). For example, when the game is a communication game (human relationship simulation game) that utilizes an opposite-sex character, the character is a character (candidate character) with which the player communicates. In one embodiment of the invention, the display processing section 120 generates the game image (first-person viewpoint image) from the first-person viewpoint of the player, and displays the generated first-person viewpoint image on the display section 220 of the HMD 200. This makes it possible to allow the player to experience virtual reality as if he/she were in the game space (CG animation world). The character appears in the game space (object space or virtual three-dimensional space) as the target of game play performed by the player. This makes it possible to allow the player to experience virtual reality as if an actual human (character) were present in front of the player. Note that a character that appears in a war game, an RPG game, a sport game, or the like as an enemy or an ally of the player may be used as the character that is used as the target of game play performed by the player.

The game parameter is a parameter that is used for the game process (e.g., the process that proceeds with the game). For example, the game parameter is a parameter that represents the status, the power, or the like of the character or the player.

Examples of the game parameter include a status parameter that represents the mental state or the state of the character, a parameter that represents the power of the character, a parameter that relates to the action of the character, a parameter that relates to goods possessed by the character, and the like. The game parameter of the character may be a parameter that represents the evaluation of the player by the character. Examples of the parameter that represents the evaluation of the player by the character include a parameter that represents the degree of favorable impression (degree of interest) possessed by the character with respect to the player, a parameter that represents the degree of intimacy (friendliness or togetherness) possessed by the character with respect to the player, a parameter that represents the degree of excitement felt by the character with respect to the player, a parameter that represents the degree of dislike felt by the character with respect to the player, a parameter that represents the degree of heartbreak felt by the character with respect to the player, a parameter that represents the degree of human relationship between the character and the player, and the like.

The game parameter may be a parameter that represents the status or the power of the player. Examples of the parameter that represents the status or the power of the player include a parameter that represents the degree of seriousness, the degree of immorality, the degree of charm, the figure, the physical condition, the spirit, the stress factor, the degree of aptitude for science, the degree of aptitude for liberal arts, the degree of unorganized knowledge, the power relating to study, exercise, or art, and the like of the player.

The part information about the character is type information (e.g., head, breast, waist, foot, or hand) about a part (part object) of the character, position information (relative position with respect to the representative position of the character) about a part of the character, shape information (shape of part object) about a part of the character, or the like.

The pose information about the character is information about the pose that specifies the motion (e.g., sitting, standing, walking, or running) of the character, for example. For example, when the character is represented by a skeleton model, shape information about the skeleton corresponds to the pose information about the character.

The type information about the character represents the type or the attribute of the character, for example. Examples of type represented by the type information about an opposite-sex character include an active type, a serious type, a spoilt type, a neat-clean type, and the like. The type information about the character may be classified by the character, the body shape, the figure, or the like of the character, for example. Note that the type information about the character may be part of the parameter information about the character.

The viewpoint information about the player is at least one of viewpoint position information, line-of-sight direction information, and virtual camera attribute information about the player, for example. The viewpoint position information is information about the position (viewpoint) of the player in the game space (object space or virtual three-dimensional space), for example. The line-of-sight direction information is information that represents the line-of-sight direction of the player at the viewpoint. The virtual camera attribute information is information about the virtual camera that is set to the viewpoint of the player. Examples of the virtual camera attribute information include angle-of-view information, parallax information (when generating a stereoscopic image), and the like.

In one embodiment of the invention, the game processing section 104 performs the process that implements the effect of the command that corresponds to the information about the character that is at least one of the position information, the direction information, the game parameter information, the part information, the pose information, and the type information about the character, and the viewpoint information that is at least one of the viewpoint position information, the line-of-sight direction information, and the virtual camera attribute information about the player.

More specifically, the game processing section 104 performs the process that implements the effect of the command that corresponds to positional relationship information about the player and the character. For example, when using a first-person viewpoint, the game processing section 104 implements the effect of the command that corresponds to the positional relationship information about the viewpoint position of the player and the position (representative position) of the character. The viewpoint position of the player is the viewpoint position of the player in the game space (object space or virtual three-dimensional space), for example. When using a third-person viewpoint, the game processing section 104 implements the effect of the command that corresponds to the positional relationship information about the position (representative position) of a player character that corresponds to the player and the position (representative position) of the character.

The positional relationship information is information that represents the relationship between the position (viewpoint position or position of player character) of the player and the position (representative position or viewpoint position) of the character. Examples of the positional relationship information include, but are not limited to, the distance (i.e., the distance in the game space) between the player and the character, and the like. The positional relationship information may be information about the directional relationship between the player and the character, for example.

The game processing section 104 performs the process that implements the effect of the command that corresponds to line-of-sight relationship information that represents the relationship between the line of sight of the player and the character.

The line-of-sight relationship information is information that represents the relationship between the line of sight of the player and the character. For example, the line-of-sight relationship information is information that represents the relative relationship between the line of sight of the player and the character. For example, the line-of-sight relationship information is information that represents the direction of the line of sight of the player with respect to the position (representative position) or each part of the character.

Examples of the line-of-sight relationship information include line-of-sight correlation information that represents the correlation between the line of sight of the player and the line of sight of the character, and the like. For example, the game processing section 104 performs the process that implements the effect of the command that corresponds to the line-of-sight correlation information about the player and the character. Examples of the line-of-sight correlation state include a first line-of-sight correlation state in which the line of sight of the player does not intersect the character, and the line of sight of the character does not intersect the player, a second line-of-sight correlation suite in which the line of sight of the player intersects the character, and the line of sight of the character does not intersect the player, a third line-of-sight correlation state in which the line of sight of the character intersects the player, and the line of sight of the player does not intersect the character, a fourth line-of-sight correlation state in which the line of sight of the player intersects the character, and the line of sight of the character intersects the player, and the like. The game processing section 104 implements the effect of the command that corresponds to each line-of-sight correlation state. For example, the game processing section 104 changes the degree of the effect of Ore command or the contents of the effect of the command corresponding to each line-of-sight correlation suite.

The game processing section 104 performs the process that implements the effect of the command that corresponds to gaze information about the player. The gaze information is at least one of gaze target part information, gaze presence/absence information, gaze time information, and gaze distance information, the gaze target part information being information about a part of the character at which the player gazes, the gaze presence/absence information being information that represents whether or not the player gazes at the character, the gaze time information representing the time in which the player gazes at the character, and lire gaze distance information representing the distance between the player and the character when the player gazes at the character. The game processing section 104 performs the process that implements the effect of the command that corresponds to the gaze information that is at least one of the gaze target part information, the gaze presence/absence information, the gaze time information, and the gaze distance information.

Specifically, the game processing section 104 calculates the gaze presence/absence information (gaze presence/absence flag) (i.e., information that represents whether or not the player gazes at the character) and the gaze target part information (i.e., information about a part of the character at which the player gazes) as the gaze information. The game processing section 104 implements the effect of the command that corresponds to the calculated gaze presence/absence information and gaze target part information.

For example, the game processing section 104 changes the degree of the effect of the command or the contents of the effect of the command corresponding to whether or not the player gazes at the character. For example, the game processing section 104 increases the degree of the effect of the command when the player gazes at the character. The game processing section 104 does not change or decreases the degree of the effect of the command when the player does not gaze at the character. The game processing section 104 changes the degree of the effect of the command or the contents of the effect of the command corresponding to a part (e.g., face, breast, hand, foot, abdomen, or hip) of the character at which the player gazes. For example, the game processing section 104 causes the degree of the effect of the command or the contents of the effect of the command to differ between the case where the player gazes at a first part (e.g., face) of the character, and the case where the player gazes at a second part (e.g., breast or hip) of the character. Alternatively, the game processing section 104 changes the degree of the effect of the command or the contents of the effect of the command when the player gazes at a specific part (e.g., face, breast, or hip) of the character.

The game processing section 104 may calculate the gaze time information (that represents the time in which the player gazes at the character) or the gaze distance information (that represents the distance between the player and the character when the player gazes at the character) as the gaze information. In this case, the game processing section 104 implements the effect of the command that corresponds to the gaze time information or the gaze distance information. For example, the game processing section 104 increases the degree of the effect of the command when the gaze time is long as compared with the case where the gaze time is short. Alternatively, the game processing section 104 increases the degree of the effect of the command when the gaze distance is short as compared with the case where the gaze distance is long.

Note that the information acquisition section 102 acquires the viewpoint information (e.g., line-of-sight information and viewpoint position information) about the player. For example, the information acquisition section 110 acquires the viewpoint information input as the operation information about the player. When using the HMD 200, the viewpoint information (e.g., line-of-sight information) about the player can be acquired based on motion detection information from the motion sensor 210 of the HMD 200. For example, the line-of-sight information that corresponds to the direction in which the head of the player faces can be calculated by calculating the rotation angle of the head of the player around the X-axis, the Y-axis, and the Z-axis using the motion sensor 210. Note that the viewpoint information (e.g., line-of-sight information) may be acquired based on the operation information from the operation section 160 (game controller). For example, the viewpoint information may be acquired (determined) based on the operation information obtained when the player has operated a direction key, an analog stick, an operation button, or the like provided to the operation section 160. When the motion of the eyeballs of the player can be detected, the viewpoint information may be calculated taking account of the motion of the eyeballs of the player. The viewpoint information about the player may be acquired using an image obtained by capturing a plurality of light-emitting devices (LED) of the light-emitting section 230 using the imaging section 150 in addition to the motion detection information from the motion sensor 210. The viewpoint information about the player may be acquired using information other than the motion detection information from the motion sensor 210 of the HMD 200. For example, a depth sensor that can detect depth information in the three-dimensional space may be provided to the imaging section 150, skeleton information about the player may extracted using the color image from the color image sensor and the depth information from the depth sensor, and the viewpoint information about the player may be acquired using the extracted skeleton information.

The game processing section 104 performs a process that changes the effect of the command that has been implemented, when the information about the character or the viewpoint information about the player has changed within a given period after the implementation of the effect of the command corresponding to the information about the character and the viewpoint information about the player. For example, when the player has selected the desired command, and the selected command has been received, the effect of the command that corresponds to the information about the character and the viewpoint information about the player is implemented. For example, the effect of the command that corresponds to the positional relationship information or the line-of-sight relationship information about the player and the character, or the gaze information about the player is implemented. The game processing section 104 performs the process that changes the effect of the command that has been implemented, when the information about the character or the viewpoint information about the player has changed within a given period after the implementation of the effect of the command. For example, when the positional relationship information or the line-of-sight relationship information about the player and the character, the gaze information about the player, or the like has changed due to the movement of the character, a change in the line of sight of the character, a change in the viewpoint position (position of player character) of the player, or a change in the line-of-sight direction of the player, the game processing section 104 changes the effect of the command corresponding to the change in the positional relationship information or the like. Alternatively, when the game parameter of the character has changed due to the implementation of the effect of the command, the game processing section 104 changes the degree of the effect of the command (that has been implemented) in synchronization with the change in the game parameter.

The game processing section 104 performs a process that implements the effect of the command based on the information about the character, the viewpoint information about the player, and a random element parameter. For example, when changing the degree of the effect of the command or the contents of the effect of the command corresponding to the information about the character and the viewpoint information about the player, a random element is applied to the degree of change in the effect of the command or the state of change in the contents of the effect of the command by utilizing the random element parameter. For example, a random element is applied to the degree of change in the effect of the command or the content change condition (whereby the contents of the effect of the command are changed) by utilizing the random element parameter. For example, when the change condition has been satisfied, the game processing section 104 changes the degree of the effect of the command or the contents of the effect of the command at the probability that is set using the random element parameter instead of necessarily changing the degree of the effect of the command or the contents of the effect of the command. Alternatively, a random element is applied to the amount of change in the degree of the effect of the command or the like by utilizing the random element parameter. For example, the game calculation section 110 increases or decreases the amount of change in the degree of the effect of the command or the like corresponding to the probability that is set using the random element parameter.

The display processing section 120 performs the display process that displays the icon that corresponds to the command. Specifically, the display processing section 120 performs a process that displays the icon that is linked to the command on the display section 220. For example, when a deck has been formed by M commands that have been selected from the N commands either automatically or by the player, the display processing section 120 displays the icons (e.g., cards) that correspond to the commands included in the deck on the display section 220.

The display processing section 120 changes the display state of the icon when at least one of the degree of the effect of the command and the contents of the effect of the command has changed. For example, when the degree of the effect of the command or the contents of the effect of the command have changed corresponding to the information about the character and the viewpoint information about the player, the display processing section 120 changes the display state of the icon so that the player can recognize that the degree of the effect of the command or the contents of the effect of the command have changed. For example, when the degree of the effect of the command or the contents of the effect of the command that corresponds to an ith icon (1≤i≤M) among first to Mth icons (deck icons) displayed on the display section 220 have changed, the display processing section 120 changes the display slate of the ith icon so that the visibility of the ith icon increases as compared with the remaining icons.

The game processing section 104 performs an icon movement control process (icon control process in a broad sense) that controls the movement of the icon corresponding to at least one of the information about the character and the viewpoint information about the player when the icon that corresponds to the command is displayed. For example, when the information about the character or the viewpoint information about the player has changed, the game processing section 104 moves the icon within the screen of the display section 220 or the like according to the movement control process that corresponds to the change in the information about the character or the viewpoint information about the player.

Specifically, the display processing section 120 performs a display process that displays a plurality of icons that respectively correspond to a plurality of commands. The game processing section 104 (icon control section 109) performs a first movement control process (first icon control process) on an icon among the plurality of icons that corresponds to a first type and a second movement control process (second icon control process) on an icon among the plurality of icons that corresponds to a second type, the second movement control process differing from the first movement control process.

For example, the game processing section 104 performs the first movement control process on the icon that corresponds to the first type (important icon) (i.e., an icon that corresponds to the command of which the effect is being implemented, an icon that corresponds to the command of which the effect has changed, or an icon that relates to the game parameter of the character), and performs the second movement control process on the icon that corresponds to the second type (i.e., an icon other than the icon that corresponds to the first type). Specifically, the game processing section 104 perform different movement control processes on the icon that corresponds to the command of which the effect is being implemented, the icon that corresponds to the command of which the effect has changed, or the icon that relates to the game parameter of the character, and the icon other than these icons.

For example, the game processing section 104 performs the first movement control process that allows the icon to remain at the original position without moving the icon on the icon that corresponds to the first type, and performs the second movement control process that moves the icon to the edge area (left edge area, right edge area, upper edge area, or lower edge area) of the screen of the display section 220, or causes the icon to disappear from the screen on the icon that corresponds to the second type. Alternatively, the game processing section 104 may perform the first movement control process that moves the icon to the edge area of the screen on the icon that corresponds to the first type, and perform the second movement control process that causes the icon to disappear from the screen on the icon that corresponds to the second type. In this case, it is desirable to display the icon that corresponds to the first type in a display state that represents that the effect of the command is being implemented, or the effect of the command has changed.

Note that the icon that corresponds to the command of which the effect is being implemented refers to an icon that corresponds to the command which has been used and of which the effect is being implemented, for example. The icon that corresponds to the command of which the effect has changed refers to an icon that corresponds to the command of which the degree of the effect or the contents of the effect have changed as a result of the implementation of the effect of the command corresponding to the information about the character and the viewpoint information about the player, for example. The icon that relates to the game parameter of the character refers to an important icon that corresponds to the command that affects the game parameter of the character when used. For example, the icon that relates to the game parameter of the character refers to an icon that corresponds to the command that increases or decreases the game parameter of the character, or changes the state or the form of the game parameter when used.

The display processing section 120 performs the display process that displays the icon so that the icon that corresponds to the command is displayed at a specific position within the display screen even when the viewpoint information about the player has changed. For example, the viewpoint information about the player changes in various ways when the player who wears the HMD 200 has changed the line-of-sight direction by moving the head, or moved the viewpoint position in the forward, backward, right ward, or leftward direction using the operation section 150. The display processing section 120 performs the display process that displays the icon so that the icon that corresponds to the command is displayed (e.g., fixed) at a specific position within the display screen of the display section 220 even when the viewpoint information about the player has changed. According to this configuration, since the icon is always displayed at the specific (identical) position even when the viewpoint position or the line-of-sight direction of the player has changed, the player can easily determine the position of the icon when selecting the icon in order to implement the effect of the command, and it is possible to provide a convenient command input interface.

The display processing section 120 performs the display process that does not display the icon that corresponds to the command when it is determined that the character is not situated within the field-of-view range of the player. The state in which the character is not situated within the field-of-view range of the player refers to a state in which the character is not displayed within the display screen observed from the player, or a state in which only a small part of the character is displayed. In such a case, the icon for implementing the effect of the command is less necessary for the player. Therefore, the icon is not displayed so that the icon does not block the field of view of the player. Specifically, the icon is not displayed within the display screen.

Note that the program and the image generation device according to the embodiments of the invention may be implemented as a server system. For example, the program according to one embodiment of the invention may be executed on a server system, and the image generation device according to one embodiment of the invention may be implemented by a server system, or may be implemented by a server system and a terminal device (client). In this case, the processing section 100 illustrated in FIG. 1 is used as a processing section of the server system or the like.

2. Method

The method according to one embodiment of the invention is described in detail below. Note that an example in which the game to which the method according to one embodiment of the invention is applied is a communication game (human relationship simulation game) with an opposite-sex character or the like is mainly described below. Note that the game to which the method according to one embodiment of the invention is applied is not limited thereto. The method according to one embodiment of the invention can also be applied to various other games such as a battle game, a role-playing game (RPG), a sport game, and an action game.

Although an example in which the display section on which the game image is displayed is the display section 220 of the HMD 200 is mainly described below, the configuration is not limited thereto. For example, the game image generated according to one embodiment of the invention may be displayed on a display section of an arcade or consumer game device, a display section of a personal computer (PC), a display section of a tablet PC, a display section of a portable terminal device (e.g., smartphone or portable game device), or the like.

Although an example in which the viewpoint information about the player is acquired using a sensor (e.g., motion sensor) provided to the HMD 200 is mainly described below, the configuration is not limited thereto. For example, the viewpoint information about the player may be acquired using a viewpoint tracking method (e.g., eye tracking method, face tracking method, or head tracking method). For example, when using an eye tracking method, the pupil position, shape, and the like of the left eye and the right eye of the player are detected (recognized). The position of the left eye, the position of the right eye, the line-of-sight direction of the left eye, the line-of-sight direction of the right eye, and the like are determined, and the viewpoint information about the player is acquired to implement viewpoint tracking. For example, the eye tracking method may be implemented by capturing (photographing) the left eye and the right eye of the player using the imaging section, and performing an image recognition process (e.g., pupil image recognition process) on the captured image. When using a face tracking method, the face of the player is captured using the imaging section, and a face image recognition process is performed on the captured image. The position and the direction of the face of the player are determined based on the results of the image recognition process, and the viewpoint position and the line-of-sight direction of the player are calculated to implement viewpoint tracking.

2.1 HMD

Figure 2:
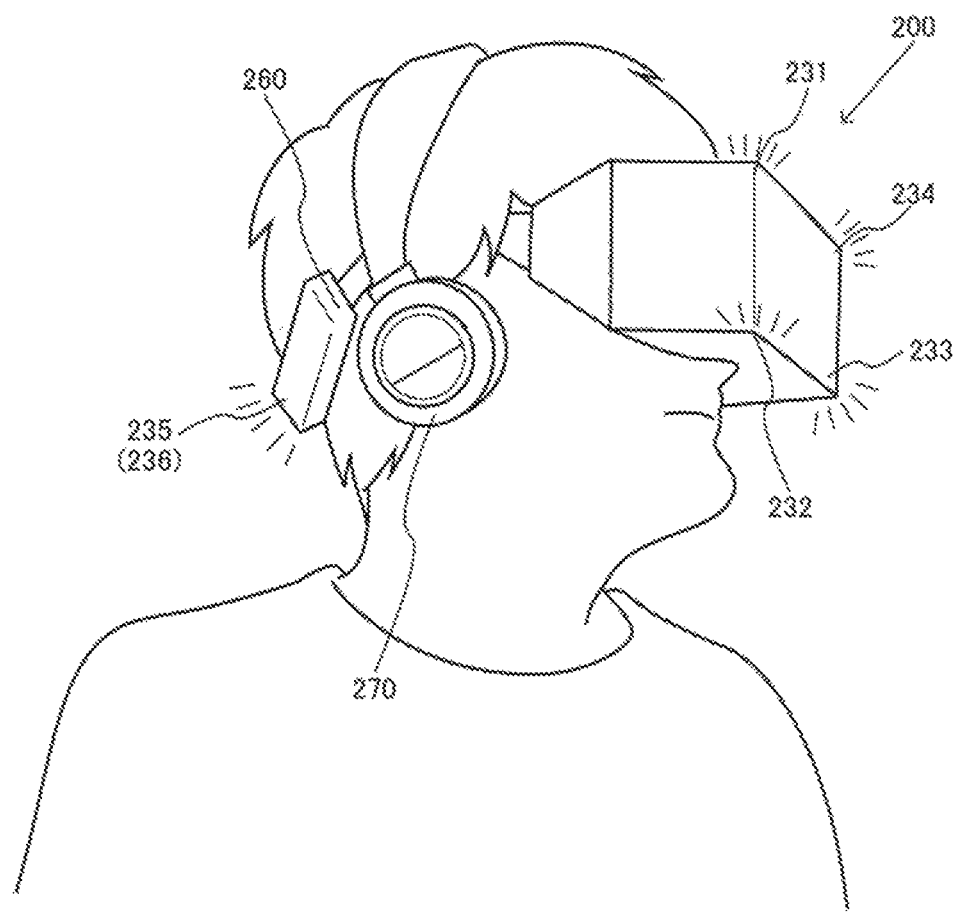
FIG. 2 illustrates an example of an HMD used in connection with one embodiment of the invention.
Figure 3:
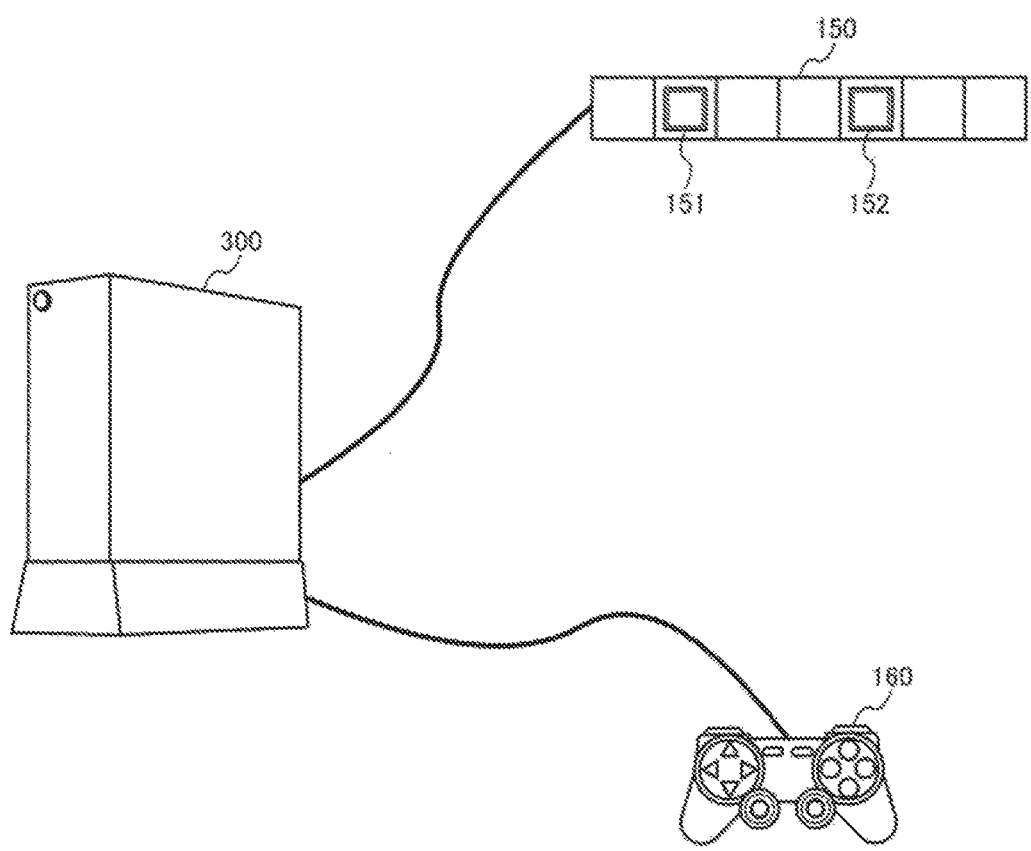

FIGS. 2 and 3 illustrate air example of the HMD 200, the imaging section 150, and the operation section 160 that are used for the image generation device according to one embodiment of the invention. As illustrated in FIG. 2, the HMD 200 includes a plurality of LED 231 to 236. The LED 231 to 234 are provided on the front side of the player, and the LED 235 and 236 are provided on the back side of the player. Note that the LED 236 is not illustrated in FIG. 2. The LED 231 to 236 emit light within the visible region, for example. More specifically, the LED 231 to 236 emit light that differs in color. As illustrated in FIG. 3, light emitted from the LED 231 to 236 is captured using the imaging section 150 that is provided on the front side of the player. Specifically, spot light emitted from the LED 231 to 236 is captured within the captured image captured using the imaging section 150. The position (three-dimensional position or motion) and the like of the head (HMD) of the player are detected by performing image processing on the captured image.

As illustrated in FIG. 3, the imaging section 150 includes a first camera 151 and a second camera 152. The position of the head of the player in the depth direction and the like can be detected using a first captured image captured using the first camera 151 and a second captured image captured using the second camera 152. The rotation angle (line of sight) of the head of the player can be detected based on the motion detection information from the motion sensor 210 (see above). Therefore, when the player faces in an arbitrary direction (within the range of 360°), it is possible to display the corresponding image (i.e., an image viewed from the virtual camera that corresponds to the viewpoint of the player) in the virtual three-dimensional space on the display section 220 of the HMD 200 by utilizing the HMD 200. Note that an LED that emits infrared light instead of visible light may be used as the LED 231 to 236. The position, the motion, and the like of the head of the player may be detected using another method such as a method that utilizes a depth camera or the like.

A head band 260 and the like are provided to the HMD 200 so that the player can more comfortably and stably wear the HMD 200 on the head. A headphone terminal (not illustrated in the drawings) is provided to the HMD 200. The player can listen to a game sound generated by a three-dimensional sound (three-dimensional audio) process by connecting a headphone 270 (sound output section 192) to the headphone terminal. The player inputs the operation information, and enjoys game play by operating the operation section 160 (game controller), and nodding or shaking his/her head. The nodding motion and the shaking motion can be detected by the motion sensor 210 of the HMD 200, for example.

2.2 Outline of Game

An outline of the game that is implemented using the method according to one embodiment of the invention is described below. The game that is implemented using the method according to one embodiment of the invention is a communication game (human relationship simulation game) in which the player communicates with an opposite-sex character that appears in the game, and tries to make a more favorable impression on the character by teaching the character, giving advice to the character, answering a question from the character, or clearing various events, for example.

The game utilizes a plurality of commands (e.g., commands for communicating with the character). FIG. 4 illustrates an example of the plurality of commands. FIG. 4 illustrates an example in which the plurality of commands are provided in the form of cards.

In one embodiment of the invention, the player forms a deck using the desired commands among the plurality of commands when starting the game, for example. Each command designates the action performed by the player. The player selects the desired actions used for the communication (lesson) with the character to form the deck. The player selects the desired command from the deck corresponding to the motion or the state of the character, and uses the selected command. In one embodiment of the invention, the degree of the effect and the contents of the effect when the player uses the command change (differ) corresponding to the distance between the player and the character, the gaze target part, the line-of-sight direction, and the like.

For example, a command CM1 ("CONCENTRATE HARDER!"), a command CM2 "SCOLD"), a command CM3 ("SPEAK"), a command CM4 ("POKE"), and a command CM5 ("GIVE ADVICE") are provided in the example illustrated in FIG. 4. The player forms the deck using a given number of commands selected from the plurality of commands provided as illustrated in FIG. 4. The player selects the desired command from the deck, and uses the selected command. The effect of the selected command is thus implemented. When the command selected by the player has been used, a new command is selected, and set to the empty slot of the deck, for example.

The command (action) can be enhanced in power, for example. Specifically, a level is set to each command (e.g., CM1, CM2, CM3, CM4, and CM5), and the degree of the effect and the contents of the effect achieved by each command differ depending on the level. For example, the degree of the effect achieved by each command increases, and the contents of the effect achieved by each command become more advanced and more special as the level increases. In the example illustrated in FIG. 4, the level of the commands CM1 and CM2 is 1. Therefore, when the command CM1 or CM2 is used, the degree of the effect is low, and the contents of the effect are less advanced (normal). The level of the command CM5 is 3. Therefore, when the command CM5 is used, the degree of the effect is high, and the contents of the effect are advanced and special. The level of each command increases corresponding to the usage count or the usage frequency of each command, the game result, or the like, and the effect thereof or the like is enhanced, for example. The game may be designed so that the player can enhance the effect of the command or the like by acquiring or purchasing an item or the like.

The process that selects a given number of commands that form the deck from the plurality of commands illustrated in FIG. 4 may be automatically performed using a command selection algorithm (program), or may be manually performed by the player.

Figure 5A:
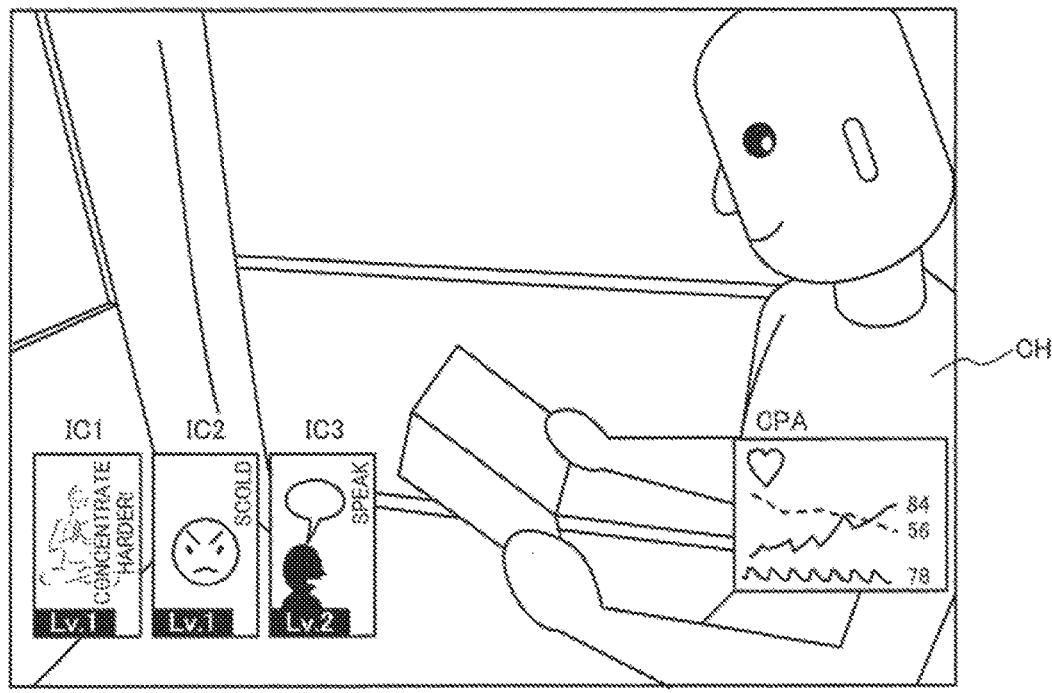
FIGS. 5A and 5B illustrate an example of a game image generated according to one embodiment of the invention.
Figure 5B:
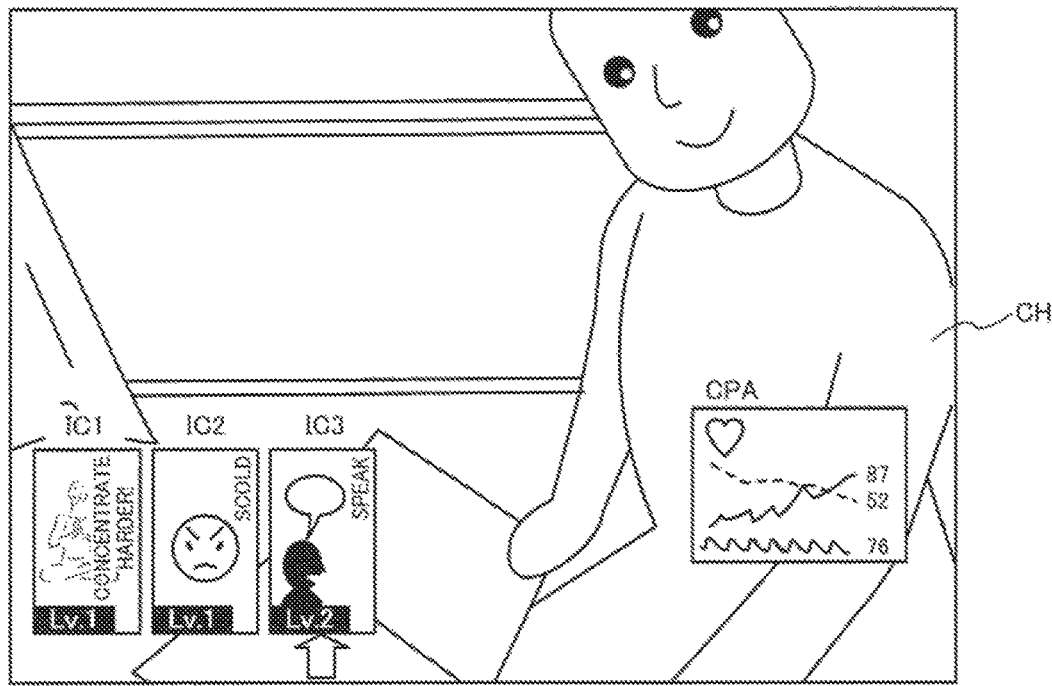

FIGS. 5A and 5B illustrate an example of the game image generated by the image generation device according to one embodiment of the invention.

The player who plays the game implemented according to one embodiment of the invention visits the house of a character CH as a tutor, and gives academic lessons, for example. A plurality of stories are provided to the game, and a different type of character appears in each story. For example, a high school student appears as the character CH in the first story, and the player gives academic lessons so that the character CH can make good grades, or passes an examination (e.g., college entrance examination). A music college student appears as the character CH in the second story, and the player gives music lessons so that the character CH can pass an audition. An elderly person appears as the character CH in the third story, and the player gives ceramic art lessons so that the character CH can win a prize in a ceramic art contest, for example. The player enjoys communicating closely with the character CH while trying to achieve the aim in each story.

In the example illustrated in FIGS. 5A and 5B, the player plays the game in which the player acts as a tutor, and gives academic lessons to the character CH, for example.

The player who plays the game wears the HMD 200 as illustrated in FIG. 2. An image that can be seen in each direction is displayed on the display section 220 of the HMD 200 while the player turns his/her gaze around (360°). For example, when the player has turned his/her gaze to the character CH in the example illustrated in FIG. 5A, an image of the character CH that studies is displayed on the display section 220. When the player has turned his/her gaze to the back side of the player, an image of furniture and the like situated on the back side of the character CH is displayed on the display section 220. Therefore, the player can experience virtual reality as if he/she were in the game world. Specifically, since the player can experience virtual reality as if he/she gave academic lessons to a student of the opposite sex in a room, it is possible to allow the player to be absorbed in the game.

In the example illustrated in FIG. 5A, the deck is formed by the commands CM1, CM2, and CM3 illustrated in FIG. 4, and icons IC1, IC2, and IC3 that respectively correspond to the commands CM1, CM2, and CM3 are displayed. For example, when the player has selected the icon IC1, the effect of the command CM1 ("CONCENTRATE HARDER!") is implemented. When the player has selected the icon IC2, the effect of the command CM2 ("SCOLD") is implemented. When the player has selected the icon IC3, the effect of the command CM3 ("SPEAK") is implemented.

Note that the player selects the icon that implements the effect of the desired command using the operation section 160 illustrated in FIG. 3, for example. For example, the player selects the icon that corresponds to the desired command using a direction key, an analog stick, a touch panel or the like provided to the operation section 160. For example, the player implements the effect of the command that corresponds to the selected icon by operating a command operation button or the like provided to the operation section 160. Note that various methods may be used as the icon (command) selection method. For example, the icon that corresponds to the command desired by the player may be selected when the player who wears the HMD 200 has shaken his/her head.

In the example illustrated in FIG. 5B, the player has selected the icon IC3 that corresponds to the command CM3 ("SPEAK"). The effect of the command CM3 ("SPEAK") is thus implemented. For example, sound data of a word or a sentence ("Hey!", "Are you working hard!", or "How is your study going!") is linked to the command CM3 ("SPEAK"). When the command CM3 has been used, the sound data is replayed, and a sound that represents the word (sentence) is output from the sound output section 192 illustrated in FIG. 1. Alternatively, the word (sentence) may be displayed on the display section 220 in the form of a "telop" or the like.

When the command has been used (when the effect of the command has been implemented), the game parameter of the character CH is affected. For example, when the command CM3 ("SPEAK") has been used, the game parameter of the character CH that corresponds to the command CM3 changes.

In the example illustrated in FIGS. 5A and 5B, a state display object CPA (balloon) that notifies the player of the state of the game parameter (i.e., the state of the character CH) is displayed.

The state display object CPA notifies the player of the current mental state, the motivation, the concentration (powers of concentration), the pulse rate, and the like of the character CH (see FIG. 6), for example. The mental state, the motivation, the concentration, and the pulse rate are provided as the game parameters of the character CH.

The mental state of the character CH is displayed (represented) using a color or the like, for example. For example, the game according to one embodiment of the invention is designed so that an assignment that should be achieved through lessons is set, and the player stops giving lessons when a given time has elapsed. The game result of the player is determined corresponding to the degree of assignment achieved through the lessons, for example. When the game result of the player is good, a card that corresponds to a command (action) with a high effect or high rarity is given to the player, for example.

For example, a red attribute, a green attribute, or a blue attribute is given to each assignment that should be achieved through lessons, and the mental state of the character CH includes a red component, a green component, and a blue component. For example, when the mental state of the character CH includes the red component in a high ratio, the character CH can promptly achieve the assignment to which the red attribute is assigned, but takes time to achieve the assignment to which the green attribute is assigned and the assignment to which the blue attribute is assigned. Likewise, when the mental state of the character CH includes the green component in a high ratio, the character CH can promptly achieve the assignment to which the green attribute is assigned, but takes time to achieve the assignment to which the red attribute is assigned and the assignment to which the blue attribute is assigned. For example, when the mental state of the character CH is represented by purple, the character CH can relatively easily achieve the assignment to which the red attribute is assigned and the assignment to which the blue attribute is assigned, but takes time to achieve the assignment to which the green attribute is assigned. Therefore, the player can appropriately complete the lessons by allowing the character CH to achieve the assignment to which the attribute suitable for the mental state of the character CH is given (i.e., increasing the degree of assignment achieved through the lessons) while observing the menial state of the character CH displayed within the stale display object CPA.

Figure 6:
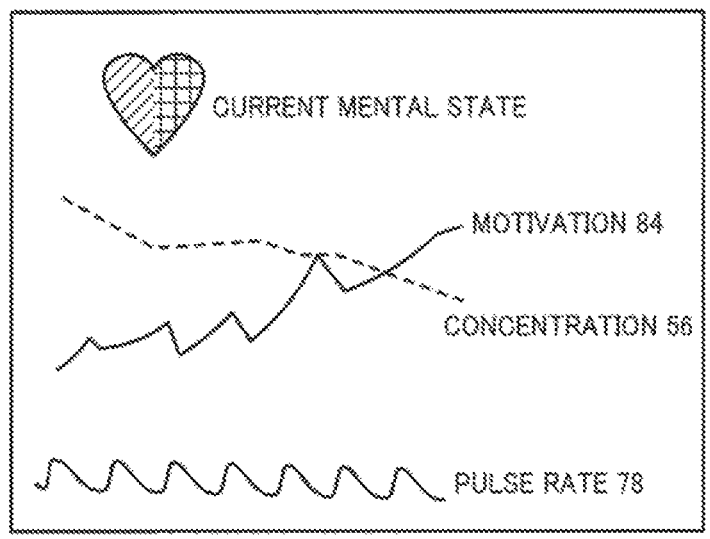
FIG. 6 is a view illustrating a game parameter of a character.

As illustrated in FIG. 6, the motivation and the concentration are set to the character CH as the game parameters. The value of the motivation (game parameter) and the value of the concentration (game parameter) change within the range of 0 to 100(%), for example. The motivation increases as the value of the motivation increases, and the concentration increases as the value of the concentration increases. The assignment achievement speed increases as the value of the motivation increases. For example, the assignment achievement speed significantly increases when the value of the motivation has become equal to or larger than a given value ("high tension state"). The value of the concentration decreases with the passing of time. The degree of decrease in the value of the concentration changes corresponding to the mental suite of the character CH. When the value of the concentration has become smaller than a given value (i.e., when concentration has been lost), it is necessary to allow the character CH to take a break. The player may appropriately allow the character CH to take a break. When the character CH has taken a break, the growth of the character CH is determined based on the mental state (mental state) of the character CH. The number of breaks that can be taken during one game is limited to a given number (e.g., 2 to 3).

The pulse rate displayed within the state display object CPA illustrated in FIG. 6 is used as the game parameter that represents the degree of excitement or the degree of favorable impression felt or possessed by the character CH with respect to the player, for example. When the degree of excitement has increased, the pulse rate increases, or the motivation increases, or a decrease in concentration does not easily occur, or the assignment achievement speed increases, for example.

2.3 Process that Implements Effect of Command that Corresponds to Positional Relationship Information or the Like A known communication game (human relationship simulation game) that utilizes a character or the like is normally a two-dimensional game that does not take account of the relationship (e.g., three-dimensional relationship) (e.g., positional relationship and line-of-sight relationship) between the player and the character.

Therefore, when the player has used the command CM3 ("SPEAK") illustrated in FIG. 4, for example, the command CM3 achieves an identical effect irrespective of the distance between the player and the character. Therefore, since the player cannot determine the distance from the character and the like, it is difficult to allow the player to experience virtual reality in an improved manner.

For example, when the player has used the command CM2 ("SCOLD") illustrated in FIG. 4, the command CM2 achieves an identical effect irrespective of whether the player faces the character in the vicinity of the character, or the player is situated apart from the character without facing the character. Therefore, it is difficult to allow the player to experience virtual reality as if he/she scolded in the real world.

When the player has used the command CM4 ("POKE") illustrated in FIG. 4, the command CM4 achieves an identical effect (e.g., the character is poked in an identical part) irrespective of whether the player is situated very close to the character, or the player is situated away from the character, for example. Therefore, since the action intended by the player is not reflected in the game, it is difficult to allow the player to experience virtual reality in air improved manner.

In order to solve the above problem, one embodiment of the invention employs a method that changes the effect of the command corresponding to the positional relationship between the player and the character, the line-of-sight relationship between the player and the character, the gaze slate, and the like. For example, the effect of the command that corresponds to information about the character (i.e., the target of game play performed by the player) and viewpoint information about the player, is implemented. For example, the degree of the effect of the command and the contents of the effect of the command are changed corresponding to the information about the character and the viewpoint information about the player. Specifically, the effect of the command that corresponds to the information about the character that is position information, direction information, game parameter information, part information, pose information, or type information about the character, and the viewpoint information about the player that is viewpoint position information, line-of-sight direction information, or virtual camera attribute information about the player, is implemented. In other words, a process that implements the effect of the command that corresponds to positional relationship information about the player and the character, line-of-sight relationship information that represents the relationship between the line of sight of the player and the character, or gaze information about the player, is performed.

FIGS. 7A to 8B are views illustrating the method that implements the effect of the command that corresponds to the positional relationship information about a player PL and the character CH.

Figure 7A:
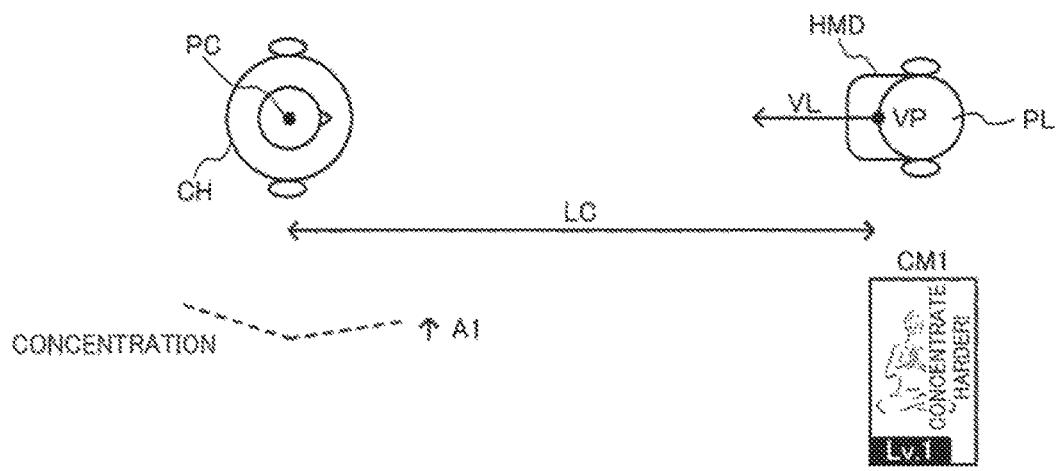
FIGS. 7A and 7B are views illustrating a process that implements the effect of a command that corresponds to positional relationship information about a player and a character.
Figure 7B:
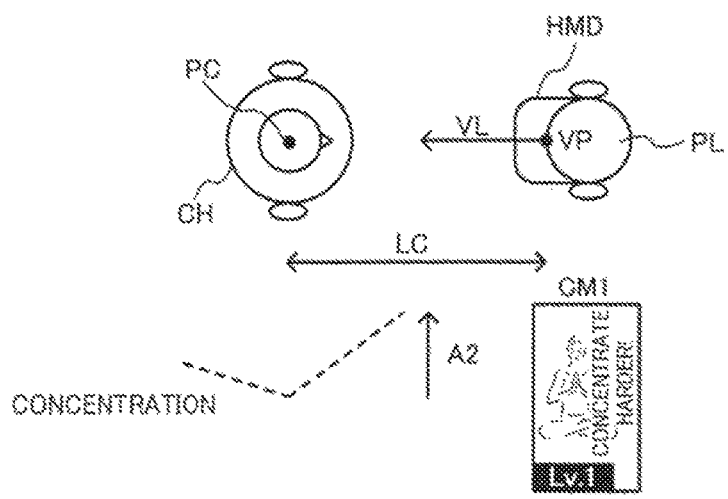

In the example illustrated in FIGS. 7A and 7B, the degree of the effect of the command is changed corresponding to the positional relationship information about the player PL and the character CH. In the example illustrated in FIGS. 7A and 7B, the positional relationship information is the distance LC between the player PL and the character CH, and the distance LC is calculated based on a viewpoint position VP that is the viewpoint information about the player PL, and a position PC that is the information about the character CH. Note that the positional relationship information may be information that represents the relationship between the direction of the player PL and the direction of the character CH.

In the example illustrated in FIGS. 7A and 7B, the player has selected and used the command CM1 ("CONCENTRATE HARDER!"). In FIG. 7A, the distance LC between the player PL and the character CH is long. In FIG. 7B, the distance LC between the player PL and the character CH is short.

In this case, the degree of the effect of the command CM1 used by the player (i.e., the degree of the effect achieved by the command CM1 used by the player) is changed corresponding to the distance LC (see FIGS. 7A and 7B). For example, the degree of the effect of the command CM1 is decreased m FIG. 7A since the distance LC is long, and is increased in FIG. 7B since the distance LC is short.

More specifically, when the player has used the command CM1 ("CONCENTRATE HARDER!"), the degree of increase in the concentration (game parameter) of the character CH is low in FIG. 7A (see A1) since the distance LC is long.

On the other hand, the degree of increase in the concentration (game parameter) of the character CH is high in FIG. 7B (see A2) since the distance LC is short.

Specifically, the command CM1 ("CONCENTRATE HARDER!") has an effect of increasing the concentration (game parameter) of the character CH. In FIG. 7B, the degree of the effect of the command CM1 (i.e., the degree of the effect achieved by the command CM1) is increased since the distance LC is short, and the degree of increase in the concentration (game parameter) of the character CH is also increased.

According to this configuration, the player can further increase the concentration of the character CH by using the command CM1 ("CONCENTRATE HARDER!") at a position close to the character CH. Therefore, it is possible to allow the player to feel as if the player spoke the words "CONCENTRATE HARDER!" at a position close to the character CH, and allow the player to experience virtual reality in an improved manner.

Figure 8A:
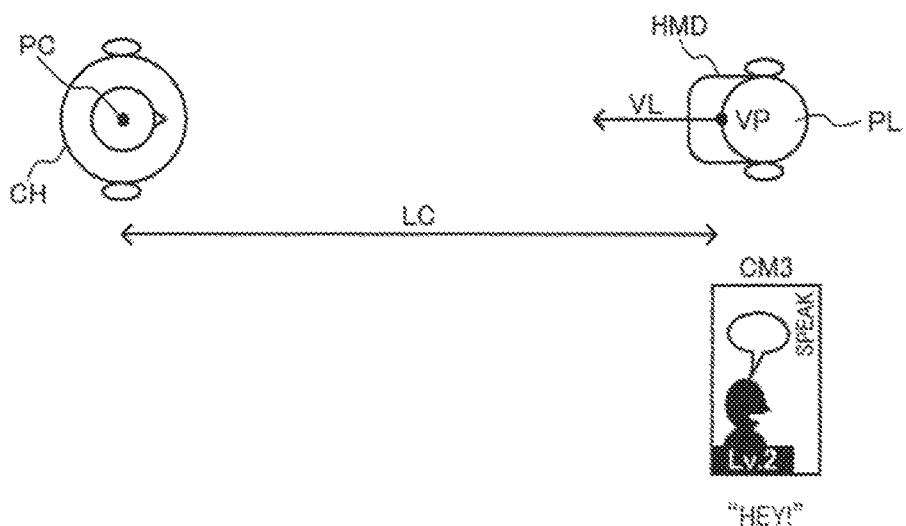
FIGS. 8A and 8B are views illustrating a process that implements the effect of a command that corresponds to positional relationship information about a player and a character.
Figure 8B:
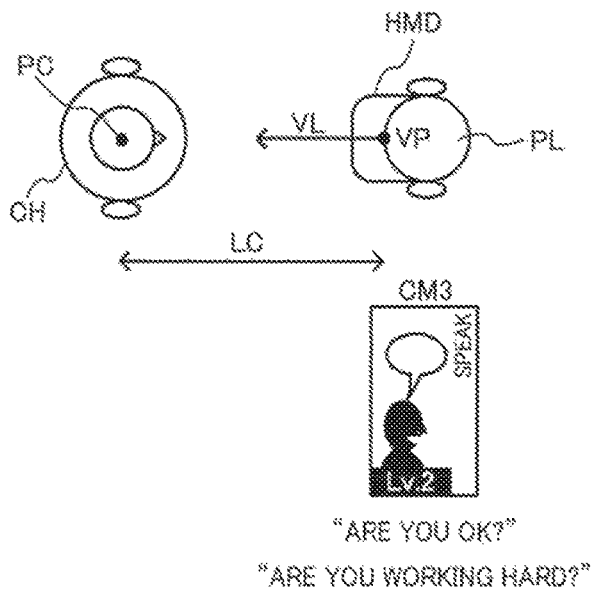

In the example illustrated in FIGS. 8A and 8B, the contents of the effect of the command are changed corresponding to the positional relationship information about the player PL and the character CH. Specifically, the contents of the effect are changed in the example illustrated in FIGS. 8A and 8B instead of changing the degree of the effect (see FIGS. 7A and 7B).

In FIG. 8A, the player has used the command CM3 ("SPEAK") in a state in which the distance LC from the character CH is long. In this case, the sound "Hey!" is output, or the text "Hey!" is displayed within the game screen in the form of a "telop" (balloon), for example.

In FIG. 8B, the player has used the command CM3 ("SPEAK") in a state in which the distance LC from the character CH is short. In this case, the sound "Are you OK?" or "Are you working hard?" is output, or the text "Are you OK?" or "Are you working hard?" is displayed within the game screen in the form of a "telop", for example.

Specifically, the contents of the effect of the command CM3 ("SPEAK") are set to the output of the sound "Hey!" (or the display of the text "Hey!" in the form of a "telop") in FIG. 8A. In FIG. 8B, the contents of the effect of the command CM3 ("SPEAK") are changed to the output of the sound "Are you OK?" or "Are you working hard?" since the distance LC is short.

According to this configuration, the contents of the effect of the command CM3 ("SPEAK") can be changed corresponding to the positional relationship between the player PL and the character CH. This makes it possible to allow the player to experience virtual reality in an improved manner, and improve the degree of variety of game representation, for example.

Figure 9A:
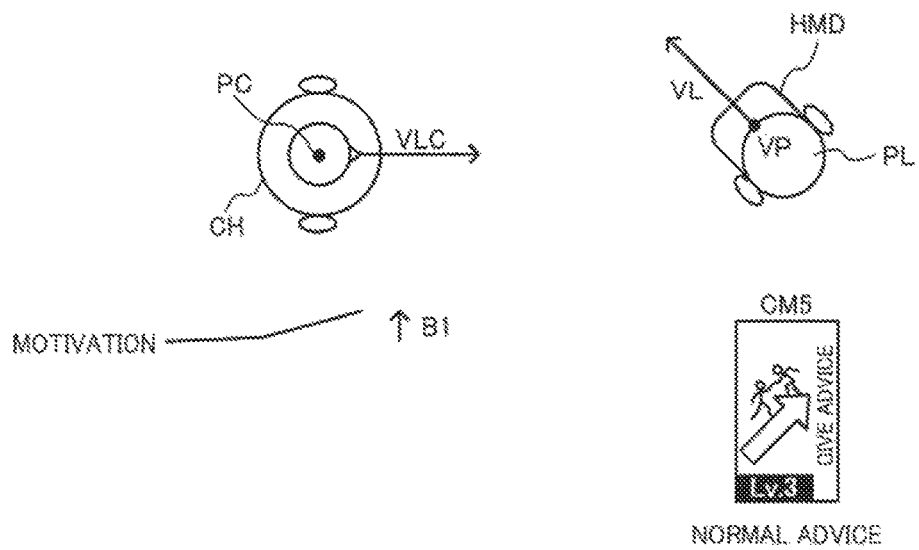
FIGS. 9A and 9B are views illustrating a process that implements the effect of a command that corresponds to line-of-sight relationship information about a player and a character.
Figure 9B:
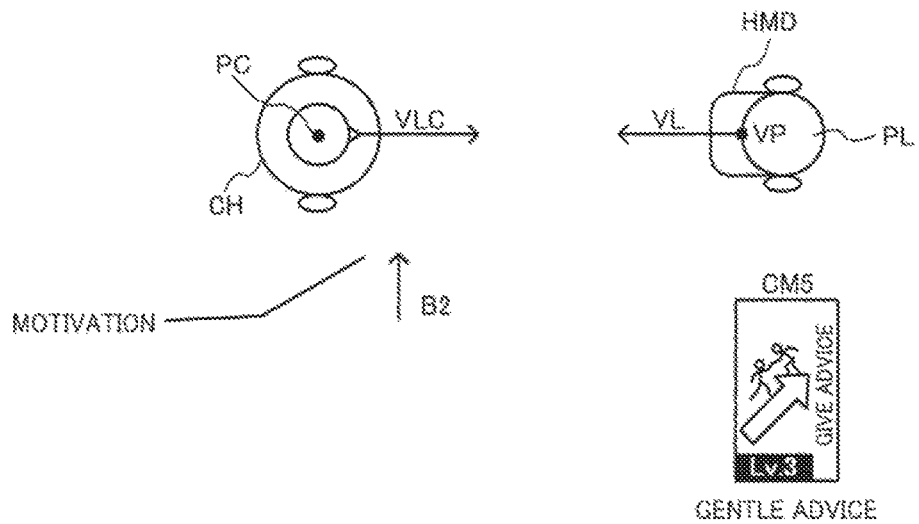

FIGS. 9A to 9B are views illustrating the method that implements the effect of the command that corresponds to the line-of-sight relationship information about the player PL and the character CH.

In the example illustrated in FIGS. 9A and 9B, the degree of the effect of the command and the contents of the effect of the command are changed corresponding to the line-of-sight relationship information about the player PL and the character CH. In the example illustrated in FIGS. 9A and 9B, the line-of-sight relationship information is information that represents the relationship between the line-of-sight direction VL of the player PL, and the position PC and the line-of-sight direction VLC of the character CH. Specifically, the line-of-sight relationship information is calculated based on the line-of-sight direction VL that is the viewpoint information about the player PL, and the position PC and the line-of-sight direction VLC that is the information about the character CH.

In the example illustrated in FIGS. 9A and 9B, the player has selected and used the command CM5 ("GIVE ADVICE"). In FIG. 9A, the line-of-sight direction VL of the player PL differs from the direction toward the position PC of the character CH. In FIG. 9B, the line-of-sight direction VL of the player PL coincides with the direction toward the position PC of the character CH. In FIG. 9A, the line-of-sight direction VL of the player PL does not extend parallel to the line-of-sight direction VLC of the character CH. In FIG. 9B, the line-of-sight direction VL of the player PL extends parallel to the line-of-sight direction VLC of the character CH. Specifically, the line-of-sight relationship information about the player PL and the character CH differ between FIG. 9A and FIG. 9B.

In this case, the degree of the effect of the command CM5 and the contents of the effect of the command CM5 are changed corresponding to the line-of-sight relationship information (see FIGS. 9A and 9B).

For example, when the line-of-sight relationship illustrated in FIG. 9A has been established, normal advice is given to the character CH as a result of using the command CM5 ("GIVE ADVICE"). For example, common advice is given to the character CH in a normal tone.

The command CM5 has an effect of increasing the motivation (game parameter) of the character CH. In FIG. 9A, the degree of increase in the motivation of the character CH is low (see B1) since the advice is normal advice.

When the line-of-sight relationship illustrated in FIG. 9B has been established, gentle advice is given to the character CH as a result of using the command CM5 ("GIVE ADVICE"). For example, motivating advice is given to the character CH in a gentle tone.

The command CM5 has an effect of increasing the motivation (game parameter) of the character CH. In FIG. 9B, the degree of increase in the motivation of the character CH is high (see B2) since the advice is gentle advice.

According to this configuration, better advice is given to the character CH, and the degree of increase in the motivation of the character CH increases when the player has used the command CM5 ("GIVE ADVICE") in a state in which the player directly faces the character CH (see FIG. 9B), as compared with the case where the player has used the command CM5 ("GIVE ADVICE") in a state in which the player does not directly face the character CH (see FIG. 9A). Therefore, it is possible to allow the player to feel as if the player gave advice to a person of the opposite sex situated in front of the player, and allow the player to experience virtual reality in a significantly improved manner.

Figure 10:
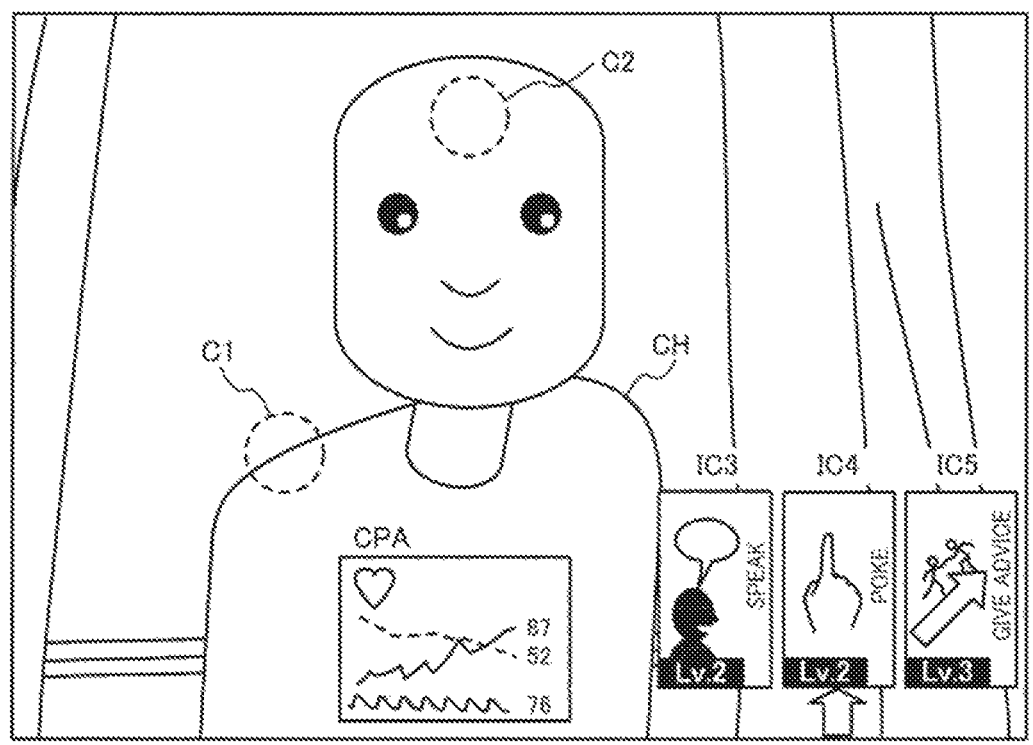
FIG. 10 is a view illustrating a process that implements the effect of a command that corresponds to gaze information about a player.
Figure 11A:
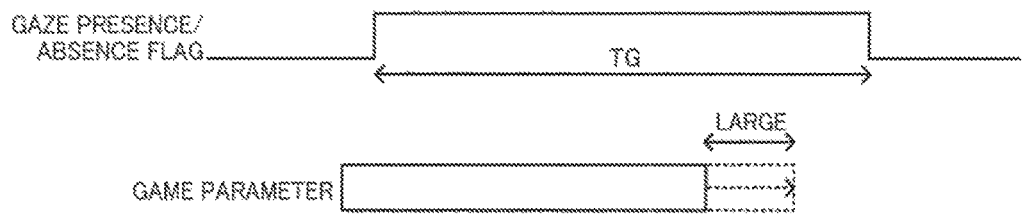
FIGS. 11A to 11D are views illustrating a process that implements the effect of a command that corresponds to gaze information about a player.
Figure 11B:
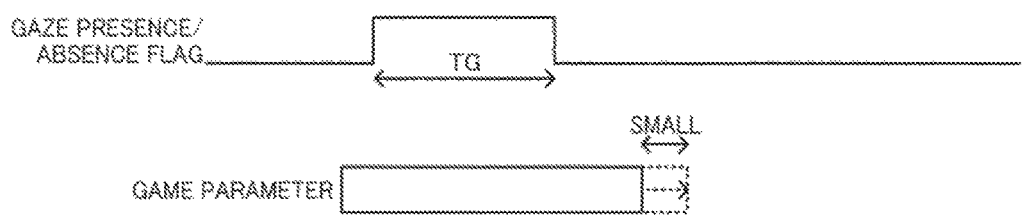
Figure 11C:
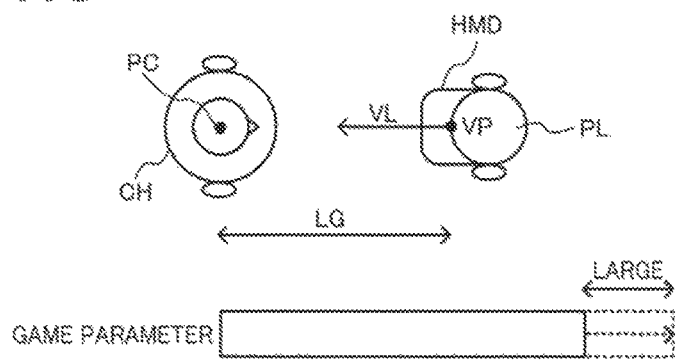
Figure 11D:
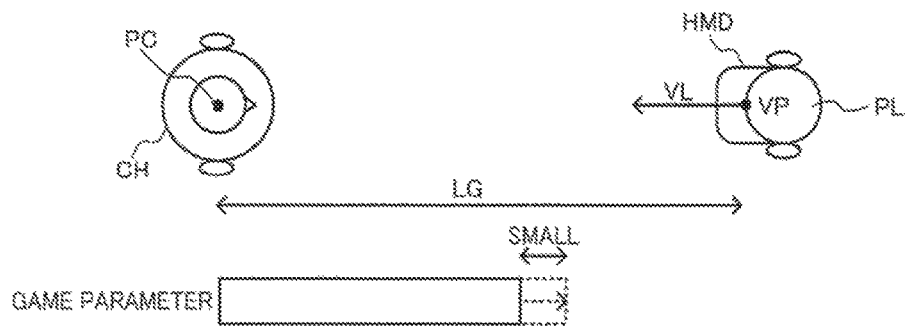

FIGS. 10 to 11D are views illustrating the method that implements the effect of the command that corresponds to the gaze information about the player.

In the example illustrated in FIG. 10, the effect of the command that corresponds to gaze target pan information that is information about the pan of the character CH at which the player gazes, is implemented.

In the example illustrated in FIG. 10, the player has used the command CM4 ("POKE") by selecting the icon IC4.

If the player has used the command CM4 ("POKE") while gazing at the shoulder (i.e., part) of the character CH (see C1 in FIG. 10), an image (picture) in which the player pokes the character CH in the shoulder is displayed. For example, an image in which the hand (object) of the player appears within the screen, and pokes the character CH in the shoulder is displayed.

If the player has used the command CM4 ("POKE") while gazing at the head (forehead) (i.e., pan) of the character CH (see C2 in FIG. 10), an image in which the player pokes the character CH in the head is displayed. For example, an image in which the hand of the player appears within the screen, and pokes the character CH in the head is displayed.

According to this configuration, when the player has used the command CM4 ("POKE"), a motion "POKE" that differs in contents (i.e., a different poking motion) is performed corresponding to the pan of the character CH at which the player gazes. Since the motion of the player is performed on the part of the character CH at which the player gazes, it is possible to allow the player to feel as if the player actually poked the character CH, and allow the player to experience virtual reality in an improved manner.

Note that the pan of the character CH at which the player gazes can be determined based on the viewpoint information (e.g., line-of-sight direction or viewpoint position) about the player, and the information (e.g., the position of the character CM or the position of the part of the character CM at which the player gazes) about the character CH. Specifically, the part of the character CH at which the player gazes can be determined by drawing a line from the viewpoint position VP of the player in the line-of-sight direction VL, and determining the part of the character CH that intersects the line.

Although the effect of the command is implemented corresponding to the gaze target pan information about the player in the example illustrated in FIG. 10, the effect of the command may be implemented corresponding to gaze presence/absence information that is information that represents whether or not lire player gazes at the character CH. For example, when the player has used the command in a slate in which the player gazes at the character CH, the degree of increase in the game parameter (e.g., motivation or concentration) of the character CH is increased. When the player has used the command in a state in which the player does not gaze at the character CH, the degree of increase in the game parameter (e.g., motivation or concentration) of the character CH is decreased, for example.

It is also possible to use gaze time information that represents the time in which the player gazes at the character, gaze distance information that represents the distance between the player and the character when the player gazes at the character, or the like as the gaze information. In one embodiment of the invention, the effect of the command may be implemented (changed) corresponding to the gaze time information or the gaze distance information.

As illustrated in FIGS. 11A and 11B, a gaze presence/absence flag is set to ON when it has been determined that the player PL gazes at the character CH, for example. A period in which the gaze presence/absence flag is set to ON corresponds to a gaze time TG.

In the example illustrated in FIG. 11A, the degree of increase in the game parameter (e.g., motivation or concentration) is increased since the gaze time TG is long. In the example illustrated in FIG. 11B, the degree of increase in the game parameter (e.g., motivation or concentration) is decreased since the gaze time TG is short.

According to this configuration, the degree of the effect of the command (i.e., the degree of the effect achieved by the command) increases as the time in which the player gazes at the character CH increases. Therefore, it is possible to represent a change in mental stale, emotion, and the like while reflecting the gaze time in which the player gazes at the character in addition to whether or not the player has gazed at the character, and implement a more realistic communication game.

In the example illustrated in FIG. 11C, a gaze distance LG that is the distance between the player PL and the character CH when the player PL gazes at the character CH is short (i.e., the player PL and the character CH closely gaze at each other). In the example illustrated in FIG. 11D, the gaze distance LG is long (i.e., the player PL gazes at the character CH at a position away from the character CH).

The degree of increase in the game parameter (e.g., motivation or concentration) is increased when the gaze distance LG is short (see FIG. 11C). The degree of increase in the game parameter (e.g., motivation or concentration) is decreased when the gaze distance LG is long (see FIG. 11D).

According to this configuration, the degree of the effect of the command (i.e., the degree of the effect achieved by the command) increases when the player PL gazes at the character CH at a position close to the character CH. On the other hand, the degree of the effect of the command (i.e., the degree of the effect achieved by the command) is moderate when the player gazes at the character CH at a position away from the character CH. Therefore, it is possible to represent a change in mental state, emotion, and the like while reflecting the distance from the character CH when the player gazes at the character CH in addition to whether or not the player has gazed at the character CH, and implement a more realistic communication game.

Although an example in which the degree of the effect of the command and the contents of the effect of the command are changed corresponding to the information about the character and the viewpoint information about the player has been described above, the configuration is not limited thereto. For example, the effect of a command that differs from the command selected by the player may be implemented corresponding to the information about the character and the viewpoint information about the player (see FIG. 14C (described later)).

In one embodiment of the invention, a process is performed that changes the effect of the command when the information about the character or the viewpoint information about the player has changed within a given period after the implementation of the effect of the command.

Figure 12A:
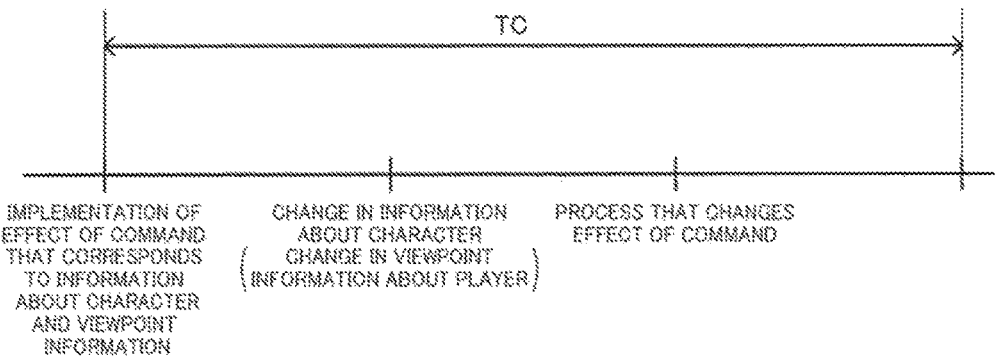
FIGS. 12A and 12B are views illustrating a process that changes the effect of a command.

In the example illustrated in FIG. 12A, the effect of the command that corresponds to the information about the character and the viewpoint information about the player is implemented. For example, the effect of the command that corresponds to the positional relationship information, the line-of-sight relationship information, or the gaze information is implemented.

When the information about the character has changed (e.g., the character has moved) before a given period TC has elapsed after the implementation of the effect of the command, or the viewpoint information about the player has changed before the given period TC has elapsed after the implementation of the effect of the command, a process that changes the effect of the command that has been implemented is performed. For example, the degree of the effect of the command is changed, or the contents of the effect of the command are changed. Alternatively, the effect of a command that differs from the command that has been used is implemented.

Figure 12B:
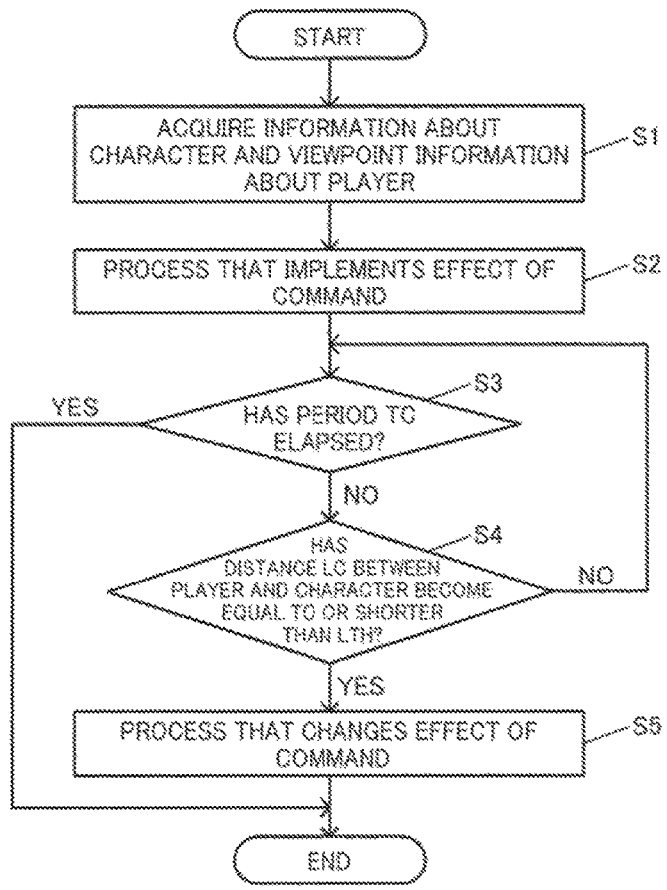

FIG. 12B is a flowchart illustrating the method (process) illustrated in FIG. 12A. The information about the character and the viewpoint information about the player are acquired (step S1). The information about the character is information about the position, the direction, the game parameter, the part, the pose, or the type of the character, for example. The viewpoint information about the player is information about the viewpoint position or the line-of-sight direction of the player, for example. These pieces of information can be acquired based on the operation information about the operation section 160, the information from the motion sensor 210 of the HMD 200, the calculation results for the game parameter of the character, and the like. The effect of the command that corresponds to the information about the character and the viewpoint information about the player is implemented (step S2).

Whether or not the given period TC has elapsed after the implementation of the effect of the command is determined (step S3). The length of the period TC may be changed corresponding to the command that has been used, or the state of the game. When the distance LC between the player and the character has become equal to or shorter than a threshold distance LTH before the period TC elapses due to the movement of the character, a change in the viewpoint position of the player, or the like, a process that changes the effect of the command is performed (steps S4 and S5). For example, the degree of the effect of the command implemented in the step S2 is increased or decreased, the contents of the effect of the command are changed, or the effect of a command that differs from the command that has been used is implemented.

FIGS. 13A to 14C are views illustrating a specific example of the process that changes the effect of the command (that has been described above with reference to FIGS. 12A and 12B).

Figure 13A:
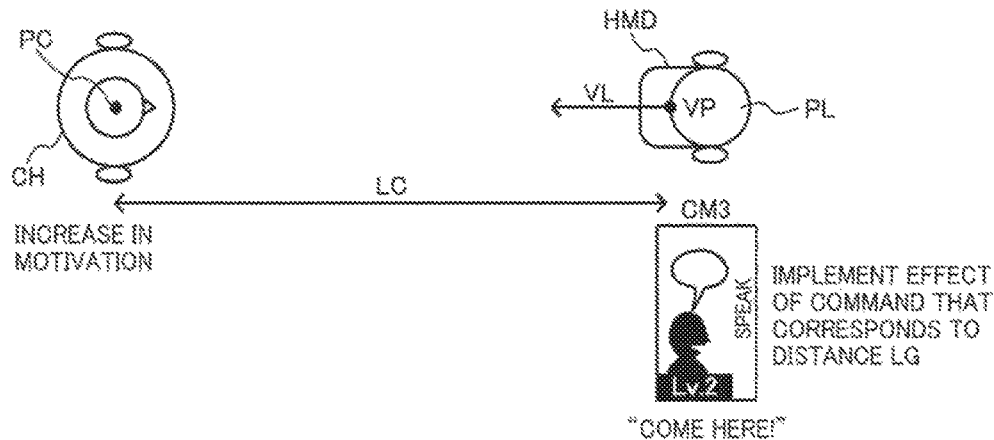
FIGS. 13A to 13C are views illustrating a process that changes the effect of a command.

In the example illustrated in FIG. 13A, the player has used the command CM3 ("SPEAK") in a state in which the distance LC between the player PL and the character CH is long. In this case, the sound "Come here!" is output (or the text "Come here!" is displayed in the form of a "telop" (hereinafter the same)) as the effect of the command CM3, for example.

Figure 13B:
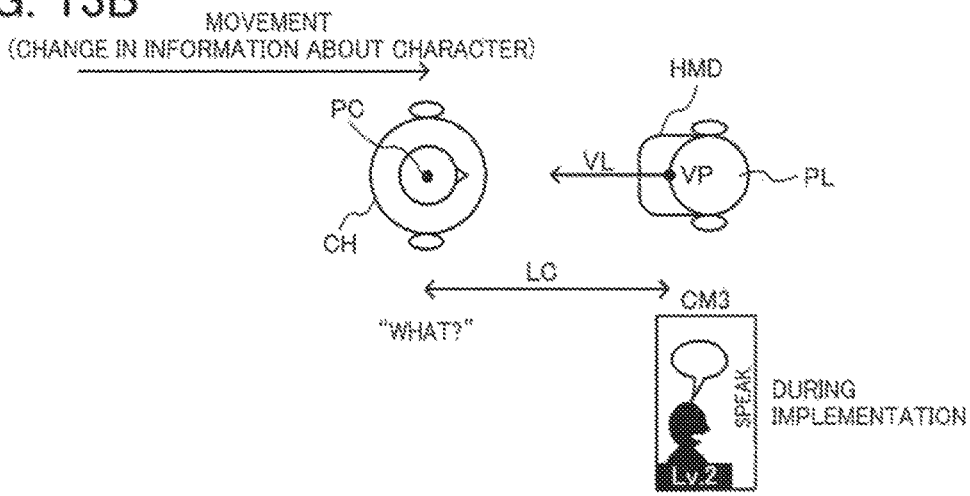
Figure 13C:
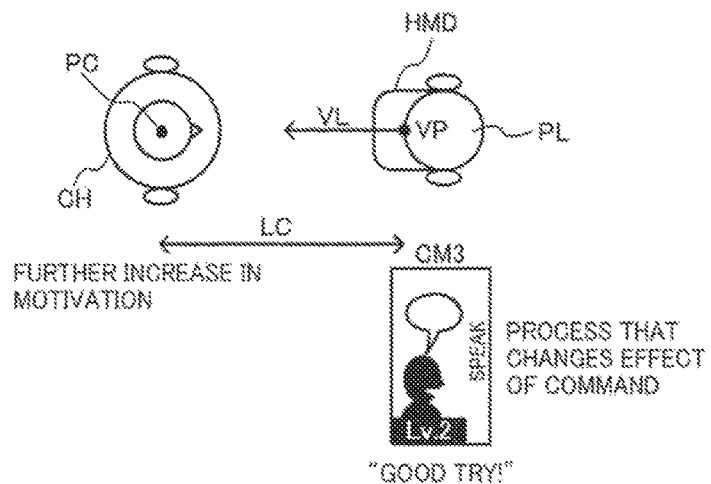

In the example illustrated in FIG. 13B, the character CH has approached the player PL while speaking "What?" in response to the action performed by the player PL. When the distance LC between the player PL and the character CM has become equal to or shorter than the threshold distance LTH (see the step S4 illustrated in FIG. 12B), the degree of the effect of the command CM3 ("SPEAK") (see FIG. 13A) increases, and the motivation of the character CH further increases (see FIG. 13C). The contents of the effect of the command CM3 are also changed, and the sound "Good try!" is output, for example.

Figure 14A:
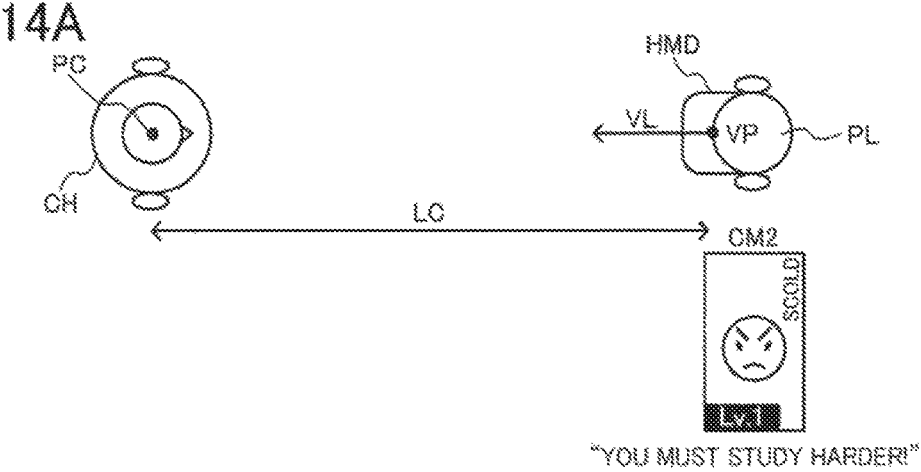
FIGS. 14A to 14C are views illustrating a process that changes the effect of a command.

In the example illustrated in FIG. 14A, the player has used the command CM2 ("SCOLD") in a state in which the distance LC between the player PL and the character CH is long. In this case, the sound "You must study harder!" is output as the effect of the command CM2, for example.

Figure 14B:
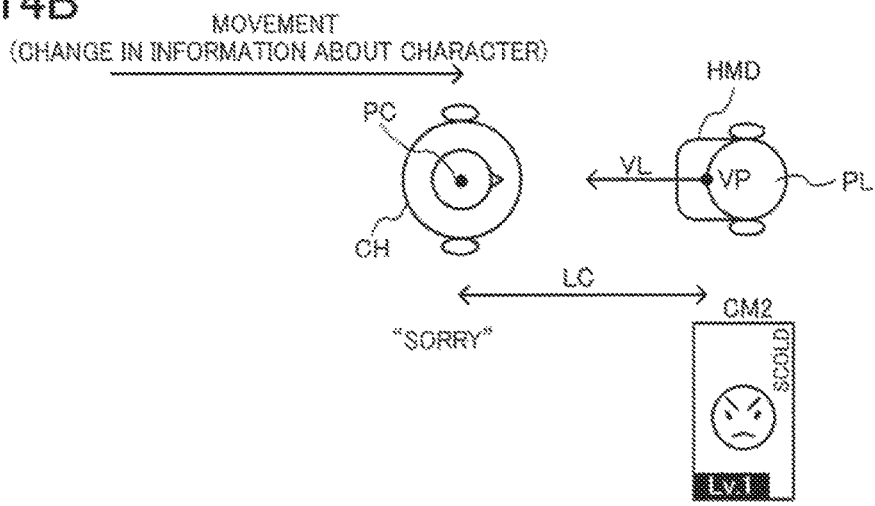
Figure 14C:
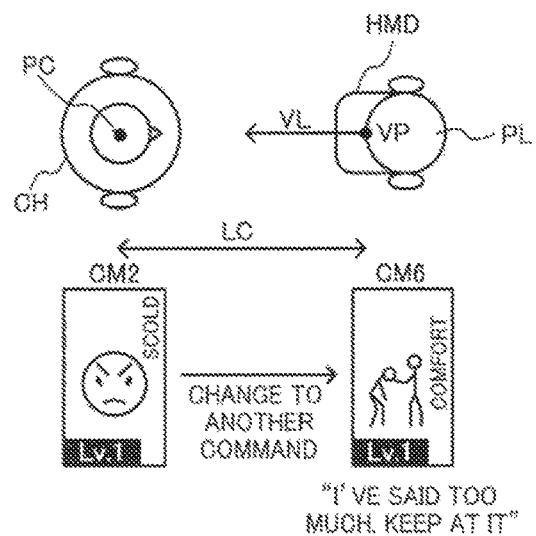

In the example illustrated in FIG. 14B, the character CH has approached the player PL while speaking "Sorry" in response to the action performed by the player PL. When the distance LC between the player PL and the character CH has become equal to or shorter than the threshold distance LTH, the command changes from the command CM2 ("SCOLD") used in FIG. 14A to another command CM6 ("COMFORT") (see FIG. 14C). The effect of the command CM6 is implemented, and the sound "I've said too much. Keep at it." is output, for example.

According to this configuration, it is possible to create a situation in which the character approaches the player in response to the command ("SCOLD" or "SPEAK") used by the player, and the command used by the player is changed to another command in response to the action performed by the character, for example. Therefore, it is possible to allow the player to feel as if the player were reacting and communicating with an actual person of the opposite sex, and allow the player to experience virtual reality in a further improved manner.

In one embodiment of the invention, a process is also performed that implements the effect of the command using a random element parameter in addition to the information about the character and the viewpoint information about the player.

Figures 15A, 15B:
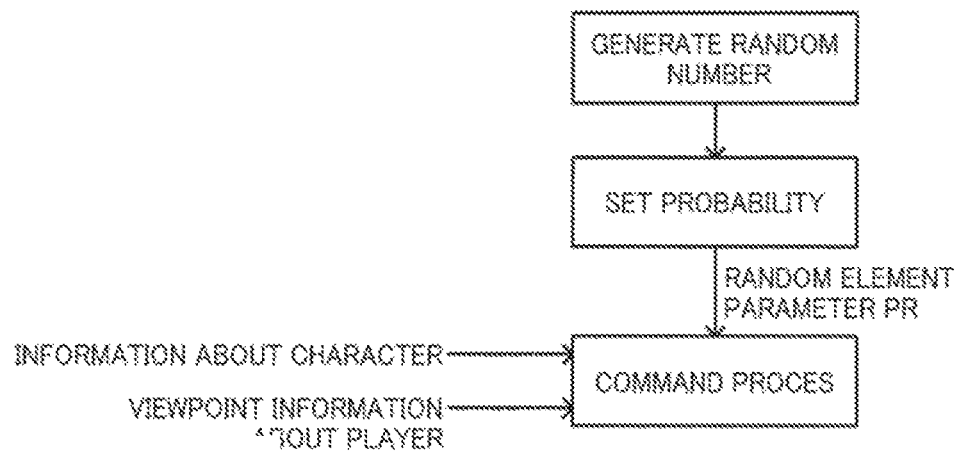
FIGS. 15A and 15B are views illustrating a command process that utilizes a random element parameter.

In the example illustrated in FIG. 15A, a random number is generated, and a probability is set based on the generated random number. More specifically, a random element parameter PR is set based on the random number, and a command process that implements the effect of the command based on the information about the character, the viewpoint information about the player, and the random element parameter PR is performed. Specifically, the process that implements the effect of the command is performed using a random element (random number element).

In one embodiment of the invention, the degree of the effect of the command that is used (implemented) is changed corresponding to the distance between the player and the character (see above), for example. In the example illustrated in FIG. 7A, when the effect of the command CM1 ("CONCENTRATE HARDER!") has been implemented, the concentration (game parameter) of the character CH increases. The degree of increase in concentration due to the command CM1 is changed corresponding to the distance LC between the player PL and the character CH, as described above with reference to FIGS. 7A and 7B. For example, the degree of increase in concentration increases as the distance LC decreases.

For example, FIG. 15B illustrates the relationship between the distance LC and an effect change ratio that represents the degree of increase in concentration. When the random element parameter PR is 1.0, the effect change ratio (i.e., the degree of increase in concentration) is 1.0, 1.1, or 1.3 when the distance LC is LC1, LC2, or LC3 (LC1>LC2>LC3), respectively. Specifically, the effect change ratio increases (i.e., the degree of increase in the concentration of the character CH increases) as the distance LC decreases.

In one embodiment of the invention, the random element parameter PR is used in connection with the effect change ratio. As illustrated in FIG. 15B, the effect change ratio when the distance LC is LC1, LC2, or L3 is set to 1.0×PR, 1.1×PR, or 1.3×PR, respectively. The random element parameter PR is set based on a random number or the like within a given range (e.g., 0.5 to 2.0). Therefore, the effect change ratio (1.0×PR, 1.1×PR, or 1.3×PR) when the distance LC is LC1, LC2, or LC3 changes randomly corresponding to the random element parameter PR. Accordingly, the degree of increase of concentration changes randomly corresponding to the random element parameter PR in the example illustrated in FIGS. 7A and 7B even when the distance LC does not change. It is possible to prevent a situation in which the degree of the effect of the command is uniformly determined (i.e., ensure that a wide variety of results are obtained) by thus randomly changing the degree of the effect achieved when the command is used. Therefore, it is possible to improve game payability and the like.

Although FIG. 15B illustrates an example in which a random element is applied to the degree of the effect of the command, the configuration is not limited thereto. For example, a random element based on the random element parameter PR may be applied to the incidence of the effect of the command (i.e., the effect achieved by the command). For example, when the player has used the command CM1 ("CONCENTRATE HARDER!") in the example illustrated in FIGS. 7A and 7B, an event in which the concentration of the character CH increases is generated at a probability that is set by the random element parameter PR. In this case, an event in which the concentration of the character CH increases does not necessarily occur even when the player has used the command CM1. This makes it possible to improve the degree of excitement felt by the player and the like, and provide a more interesting game, for example.

2.4 Icon Control Process

In one embodiment of the invention, various control processes are performed on the icon that is displayed corresponding to each command. For example, when the degree of the effect of the command or the contents of the effect of the command have changed, the display state of the icon that corresponds to the command is changed.

Figure 16A:
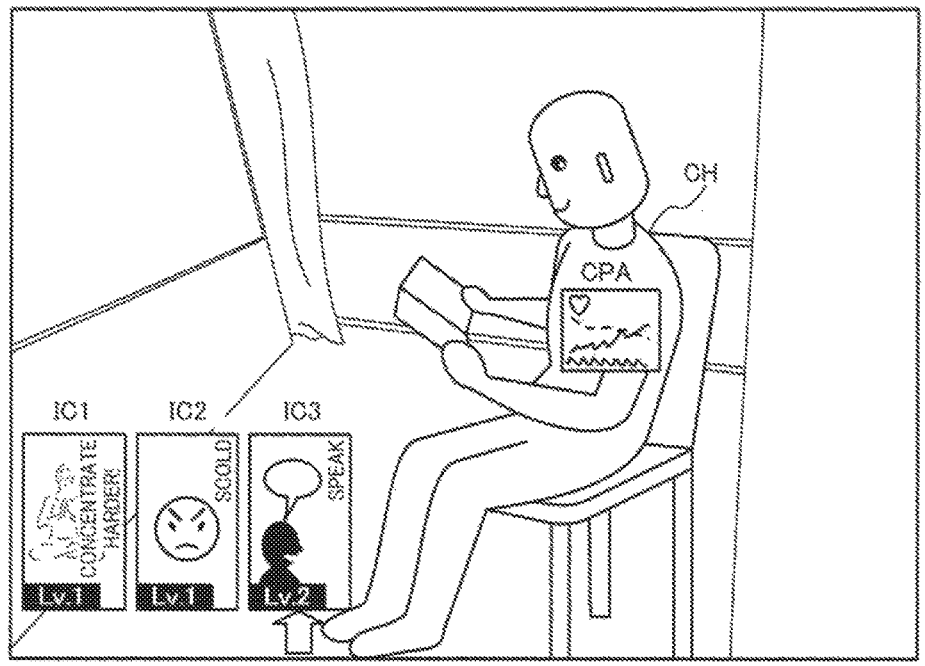
FIGS. 16A and 16B illustrate an example of a game image generated according to one embodiment of the invention.
Figure 16B:
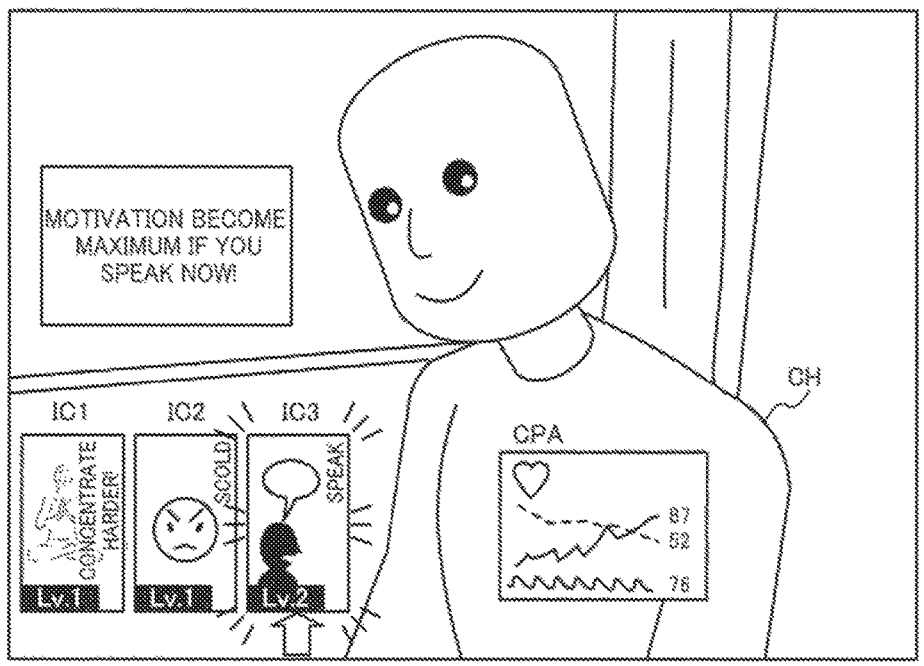

In the example illustrated in FIGS. 16A and 16B, the player has selected the icon IC3 that corresponds to the command CM3 ("SPEAK"). When the command CM3 ("SPEAK") has been used, the motivation of the character CH increases, for example. In FIG. 16B, the player is situated close to the character CH as compared with FIG. 16A, and the motivation increase rate (i.e., a change in the degree of the effect of the command) has become a maximum.

The display state of the icon IC3 that corresponds to the command CM3 is changed in order to effectively notify the player that the motivation increase rate has become a maximum. Specifically, the visibility of the icon IC3 is improved by displaying the icon IC3 in a blinking state or the like.

According to this configuration, it is possible to allow the player to visually determine that the motivation of the character CH increases to a large extent by using the command CM3 ("SPEAK") in a state in which the player is situated close to the character CH (see FIG. 16B). This makes it possible to provide a user-friendly command input interface that is highly convenient to the player, for example.

Although an example in which the display state of the icon that corresponds to the command is changed when the degree of the effect of the command has changed has been described above (see FIGS. 16A and 16B), the configuration is not limited thereto. For example, the display state of the icon may be changed when the contents of the effect of the command have changed (see FIGS. 8A and 8B). Alternatively, the display state of the icon may be changed when the command has changed to another command (see FIG. 14C).

The process that changes the display state of the icon may be implemented in various ways. For example, the process that changes the display state of the icon may be implemented by a process that changes the color, the shape, or the brightness of the icon, a process that adds an effect (e.g., animation) to the icon, or the like.

One embodiment of the invention employs a method that performs the movement control process on the icon corresponding to the information about the character and the viewpoint information about the player. FIG. 17A is a flowchart illustrating this method (process).

The information about the character and the viewpoint information about the player are acquired (step S11). Specifically, the information about the character such as the position, the direction, the game parameter, the part, the pose, or the type of the character, and the viewpoint information about the player such as the viewpoint position or the line-of-sight direction of the player are acquired.

When the control target icon is an icon that corresponds to the first type, the first movement control process (first icon control process) is performed to the icon (steps S12 and S13). When the control target icon is an icon that corresponds to the second type, the second movement control process (second icon control process) is performed to the icon (steps S14 and S15).

Note that the icon that corresponds to the first type refers to an icon that corresponds to the command of which the effect is being implemented, an icon that corresponds to the command of which the effect has chanced, or an important icon that relates to the game parameter of the character, for example. The icon that corresponds to the second type is an icon other than these icons. According to the process illustrated in FIG. 17A, different movement control processes are performed on the icon that corresponds to the command of which the effect is being implemented, the icon that corresponds to the command of which the effect has changed, or the icon that relates to the game parameter of the character, and the icon other than these icons.

As illustrated in FIG. 17B, various flags such as an implementation flag, an effect change flag, and a game parameter-related flag are linked to each command teach icon) among a plurality of commands, for example. The implementation flag is a flag that indicates that the command is a command (icon) of which the effect is being implemented. The effect change flag is a flag that indicates that the command is a command of which the effect has changed. The game parameter-related flag is a flag that indicates that the command is a command that relates to the game parameter of the character.

It is possible to perform different movement control processes (icon control processes) on the icon that corresponds to the command of which the effect is being implemented, the icon that corresponds to the command of which the effect has changed, or the icon that relates to the game parameter of the character, and the icon other than these icons, by utilizing these flags.

Figure 18A:
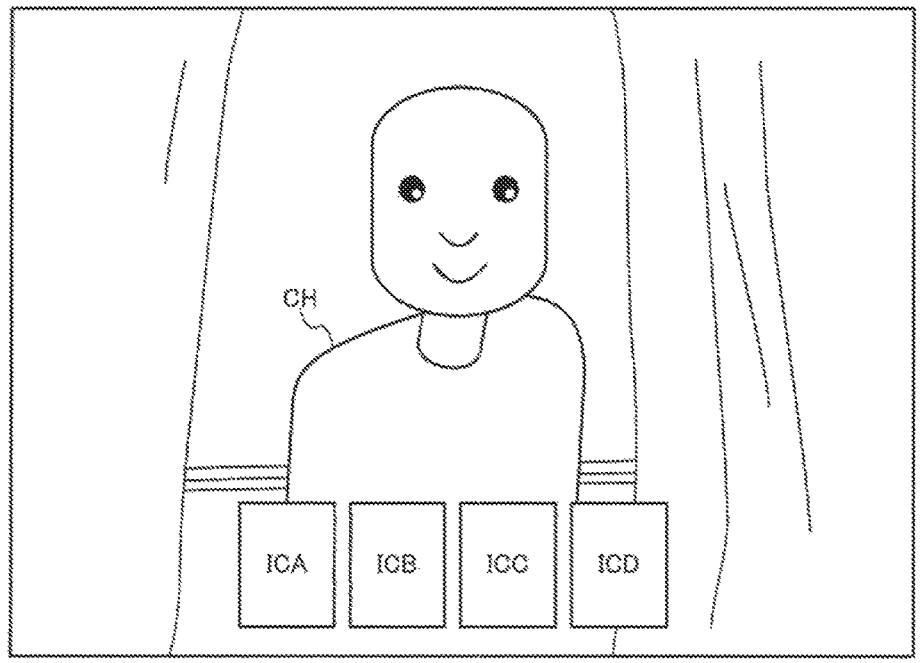
FIGS. 18A and 18B illustrate an example of a game image generated according to one embodiment of the invention.

In the example illustrated in FIG. 18A, the distance between the player (i.e., the viewpoint position of the player) and the character CH is long, and icons ICA, ICB, ICC, and ICD for using the command are displayed around the center of the lower part of the screen.

Figure 18B:
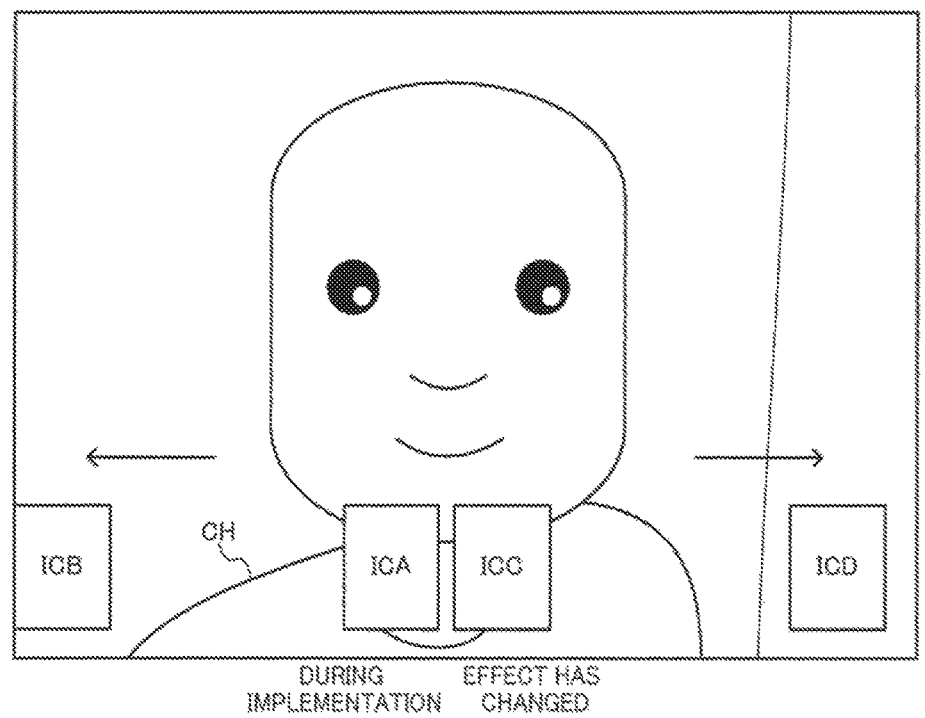

In the example illustrated in FIG. 18B, the player (viewpoint position) is situated close to the character CH, and the face of the character CH is displayed in a close-up state. In this case, if all of the icons ICA, ICB, ICC, and ICD are displayed around the center of the lower part of the screen (see FIG. ISA), part of the face of the character CH displayed in a close-up state may be hidden behind the icons, for example.

Therefore, the icons ICB and ICD that are less important for the game are moved to the edge area of the screen (see FIG. 18B). Alternatively, the icons ICB and ICD are moved to the outside of the screen (i.e., deleted from the screen).

The icon ICA that corresponds to the command of which the effect is being implemented, and the icon ICC that corresponds to the command of which the effect has changed are allowed to remain at the original position without moving the icons ICA and ICC. Alternatively, the icon ICA is moved to the left by a short distance (given distance), and the icon ICC is moved to the right by a short distance (given distance) so as not to reach the edge of the screen (i.e., to a position away from the edge of the screen by a given distance), for example. Specifically, the moving distance of the icons ICA and ICC is reduced as compared with the moving distance of the icons ICB and ICD. Note that the movement of the icon (important icon) that relates to the game parameter of the character CH is controlled in the same manner as the icons ICA and ICC.

In the example illustrated in FIGS. 18A and 18B, difference movement control processes are performed on the icons ICA and ICC and the icons ICB and ICD in this manner.

Note that the icon ICA is an icon that corresponds to the command which has been used and of which the effect is being implemented. The icon ICC is an icon that corresponds to the command of which the degree of the effect or the contents of the effect have changed as a result of the implementation of the effect of the command corresponding to the information about the character and the viewpoint information about the player, for example. The icon that relates to the game parameter of the character is an icon that corresponds to the command that changes the game parameter (e.g., motivation, concentration, or degree of favorable impression) of the character when the command has been used and the effect of the command has been implemented. The icon that relates to the game parameter of the character is an important icon with respect to the game process.

According to the icon movement control process illustrated in FIGS. 18A and 18B, since the less important icons ICB and ICD are moved to the edge area of the screen, it is possible to suppress or reduce the occurrence of a situation in which part of the face of the character CH displayed in a close-up state is hidden behind the icons ICB and ICD, for example. Since the important icons ICA and ICC are allowed to remain at a position around the center of the lower part of the screen, the player can easily perform a command input operation, for example.

Figure 19A:
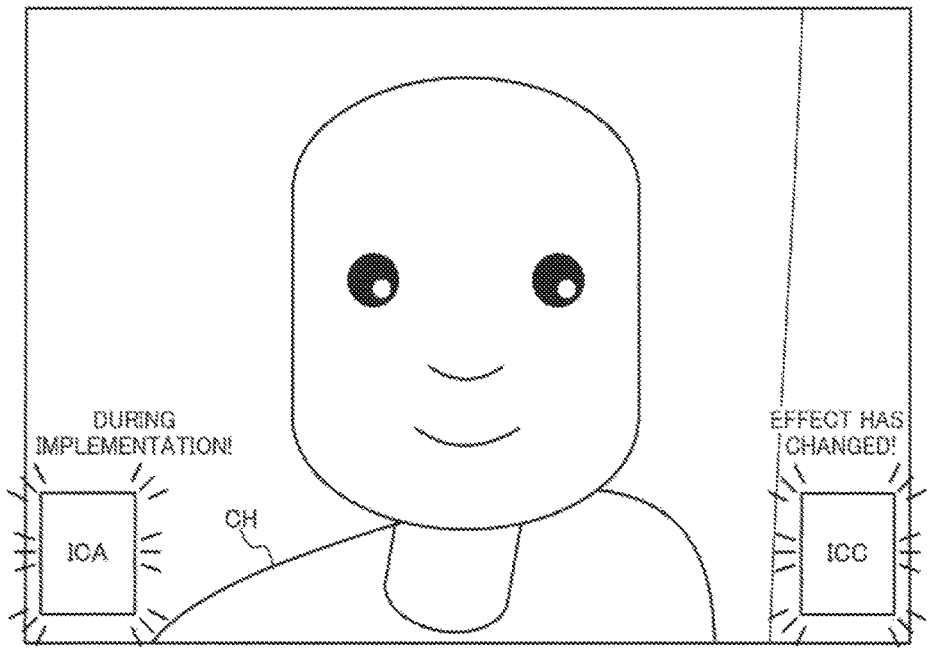
FIGS. 19A and 19B illustrate an example of a game image generated according to one embodiment of the invention.

In the example illustrated in FIG. 19A, the icon ICA that corresponds to the command of which the effect is being implemented, and the icon ICC that corresponds to the command of which the effect has changed are also moved to the edge area of the screen. The display state of the icons ICA and ICC is changed in the same manner as described above with reference to FIG. 16B. For example, the visibility of the icons ICA and ICC is improved by displaying the icons ICA and ICC in a blinking state.

In this case, the icon that relates to the game parameter of the character CH is also moved to the edge area of the screen in the same manner as the icons ICA and ICC. The visibility of the icon that relates to the game parameter of the character CH is improved by performing air appropriate display process.

On the other hand, the less important icons ICB and ICD (see FIG. 18B) are moved to the outside of the screen (i.e., deleted from the screen), for example.

According to this configuration, since the icons ICA and ICC are moved to the edge area of the screen, it is possible to suppress or reduce the occurrence of a situation in which pan of the face of the character CH displayed in a close-up state is hidden behind the icons ICA and ICC, for example. It is also possible for the player to easily perform a command input operation by changing the display state of the icons ICA and ICC that have been moved to the edge area of the screen to improve the visibility of the icons ICA and ICC, for example.

Figure 19B:
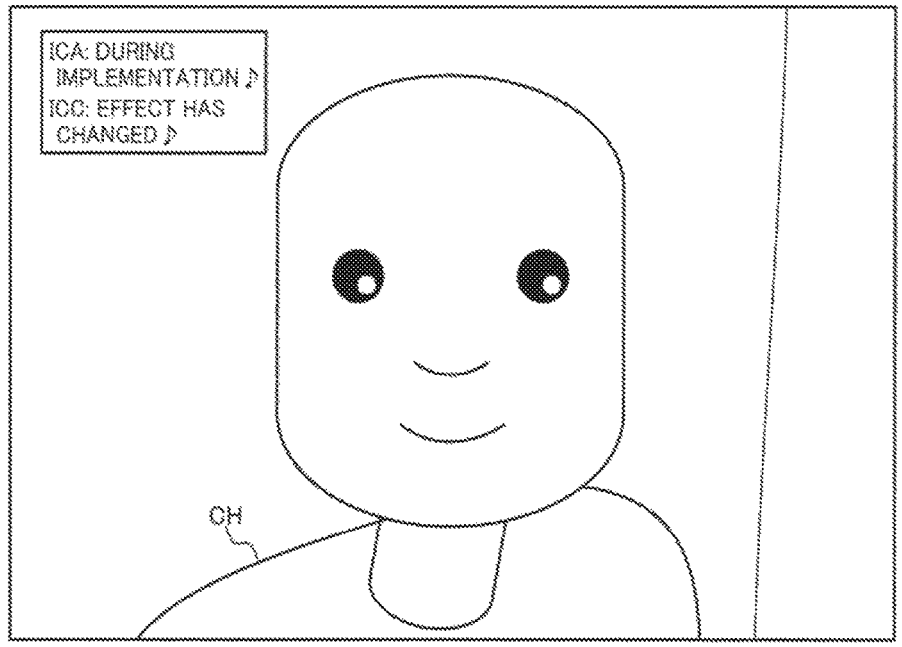

As illustrated in FIG. 19B, when the player has approached the character CH, and the face of the character CH is displayed in a close-up state, for example, the important icons ICA and ICC may also be deleted from the screen, in this case, a notification that notifies the player that the effect of the command that corresponds to the icon ICA is being implemented, and the effect of the command that corresponds to the icon ICC has changed is displayed within the screen (see FIG. 19B). Alternatively, a sound that notifies the player that the effect of the command that corresponds to the icon ICA is being implemented, and the effect of the command that corresponds to the icon ICC has changed is output. According to this configuration, it is possible to suppress or reduce the occurrence of a situation in which the virtual reality experienced by the player deteriorates due to the display of the icon when the player has approached the character CH, and enjoys experiencing virtual reality.

2.5 Modifications

Although an example in which the position information or the direction information about the character is used as the information about the character that changes the degree of the effect of the command, the contents of the effect of the command, or the like has been mainly described above, the game parameter information, the part information, the pose information, or the type information about the character may also be used as the information about the character, for example.

For example, the information about the character that changes the degree of the effect of the command, the contents of the effect of the command, or the like may be the parameter information about the character. For example, when player has used the command CM5 ("GIVE ADVICE"), the degree of the effect of the command CM5 is increased when the motivation or the concentration (game parameter) of the character CH is high. For example, the degree of assignment achieved by the character CH is increased, or the increase rate of the game parameter (e.g., degree of favorable impression, degree of intimacy, or degree of excitement) other than the motivation or the concentration is increased.

The information about the character that changes the degree of the effect of the command, the contents of the effect of the command, or the like may be the pan information or the pose information about the character.

Figure 20A:
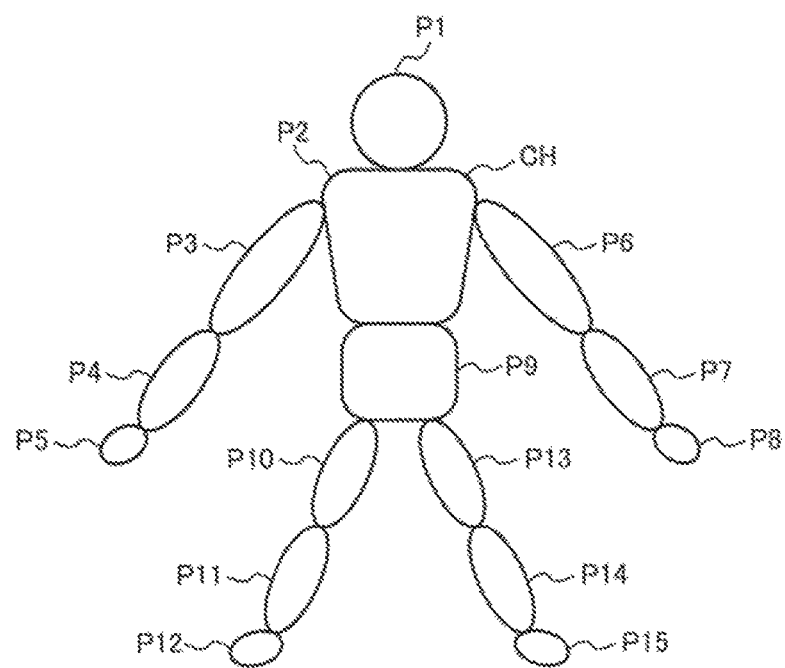
FIGS. 20A and 20B are views illustrating part information, pose information, and the like about a character.
Figure 20B:
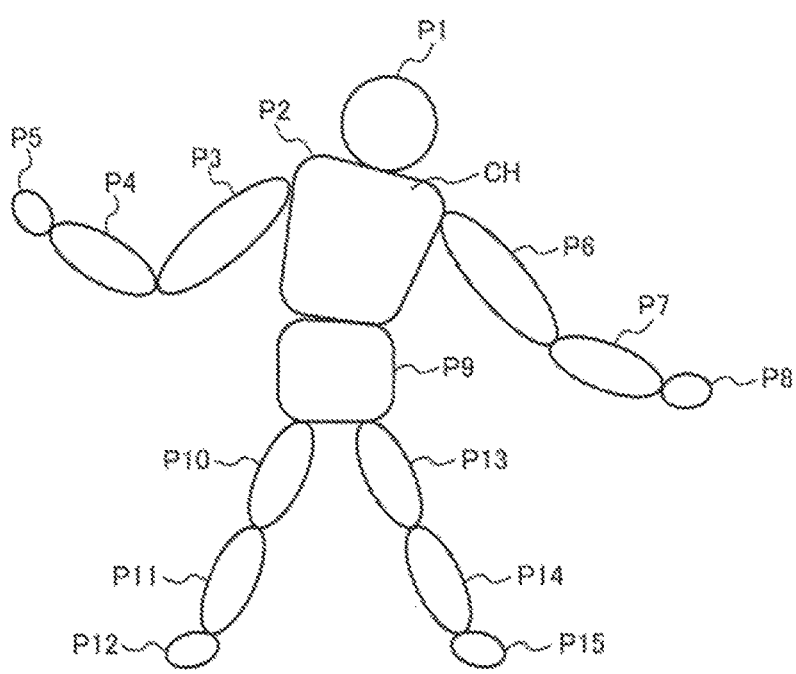

As illustrated in FIGS. 20A and 20B, the model object of the character CH includes a plurality of parts P1 to P15 (part objects), for example. The position and the direction of the pans P1 to P15 are determined based on the motion data that sets the shape of the skeleton of the model object, for example. When the representative position of the character CH has been calculated, the position and the direction of the parts P1 to P15 are determined based on the representative position and the motion data, for example, the part information (e.g., part position) about the character CH is used determine the gaze target part (e.g., shoulder or head) of the player (see FIG. 10). For example, when the viewpoint position or the line-of-sight direction of the player, and the position of the part of the character CH can be determined, it is possible to determine a part among the parts P1 to P15 of the character CH at which the player gazes. The degree of the effect of the command, the contents of the effect of the command, or the like is changed corresponding to the part at which the player gazes (see above).

The pose information about the character CH can be determined based on the position and the direction of the parts P1 to P15 (see FIG. 20A). For example, the position and the direction of the parts P1 to P15 differ between FIG. 20A and FIG. 20B, and the pose of the character CH also differs between FIG. 20A and FIG. 20B. Specifically, the pose information about the character CH can be determined based on the motion data of the model object of the character CH. For example, when player has used the command CM1 ("CONCENTRATE HARDER!"), the degree of the effect of the command CM1 or the like is caused to differ between the case where the character CH is in a sitting position and the case where the character CH is in a standing position. For example, the increase rate of the concentration of the character CH due to the command CM1 is increased when the character CH is in a sitting position, and decreased when the character CH is in a standing position.

The information about the character that changes the degree of the effect of the command, the contents of the effect of the command, or the like may be the type information about the character. The type information represents the type or the attribute of the character CH. For example, when player has used the command CM2 ("SCOLD"), the value of the motivation (game parameter) of the character CH increases when the type of the character CH is "active", and increases to only a small extent, or decreases (due to depression) when the type of the character CH is "serious".

For example, when player has used the command CM3 ("SPEAK"), the player's voice that is generated as a result of the effect of the command CM3 ("SPEAK") sounds excited or quavering when the type of the character CH is "beautiful (good figure)". Specifically, the contents of the effect of the command that has been implemented change corresponding to the type information about the character CH.

In one embodiment of the invention, the display process that displays the icon is performed so that the icon that corresponds to the command is displayed at a specific position within the display screen even when the viewpoint information about the player has changed. The display process that does not display the icon that corresponds to the command is performed when it is determined that the character CH is not situated within the field-of-view range of the player.

Figure 21A:
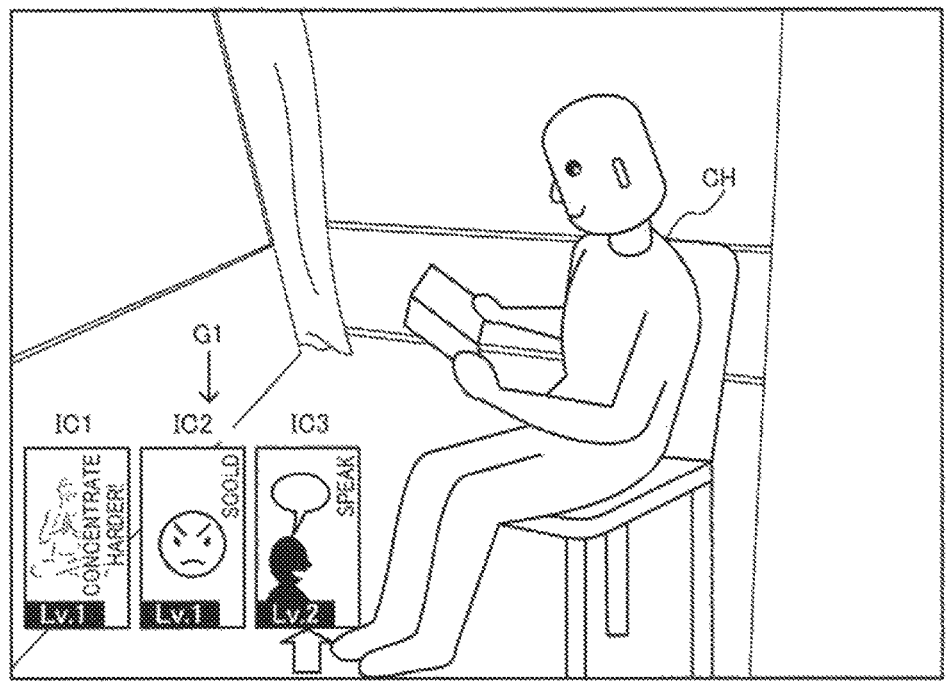
FIGS. 21A and 21B are views illustrating a method that displays an icon that corresponds to a command at a specific position.
Figure 21B:
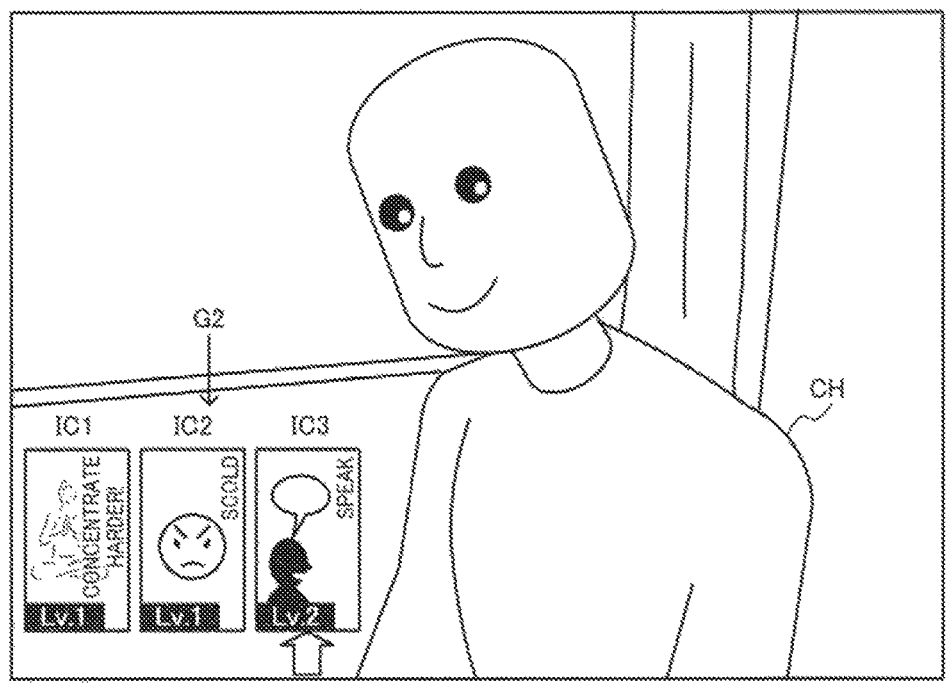

For example, the viewpoint information (e.g., viewpoint position or line-of-sight direction) about the player differs between FIG. 21A and FIG. 21B. For example, the viewpoint position of the player is situated close to the character CH in FIG. 21B as compared with FIG. 21A. and the line-of-sight direction of the player differs between FIG. 21A and FIG. 21B correspond. For example, when the player plays the game while wearing the HMD 200 (see FIG. 2), the line-of-sight information (e.g., line-of-sight direction or viewpoint position) about the player determined by the motion sensor 210 of the HMD 200 or the like changes frequently.

In one embodiment of the invention, the icons IC1, IC2, and IC3 that correspond to the commands are displayed (fixed) at a specific position within the display screen (game screen) (see G1 in FIG. 21A and G2 in FIG. 21B correspond) even when the viewpoint information about the player has changed. Specifically, while the viewpoint position and the line-of-sight direction of the player differ between FIG. 21A and FIG. 21B correspond, the icons IC1. IC2, and IC3 are always displayed at a specific (identical) position (see G1 and G2).

According to this configuration, when the player selects one of the icons IC1, IC2, and IC3 in order to implement the effect of the command, the player can easily determine the positions of the icons IC1, IC2, and IC3, for example. Specifically, since the icons IC1, IC2, and IC3 are displayed (fixed) at a specific position, the player can select the desired icon without being confused, and implement the effect of the command that corresponds to the selected icon.

In one embodiment of the invention, the icons IC1, IC2, and IC3 that correspond to the commands are thus displayed to follow the viewpoint position and the line-of-sight direction of the player.

Figure 22:
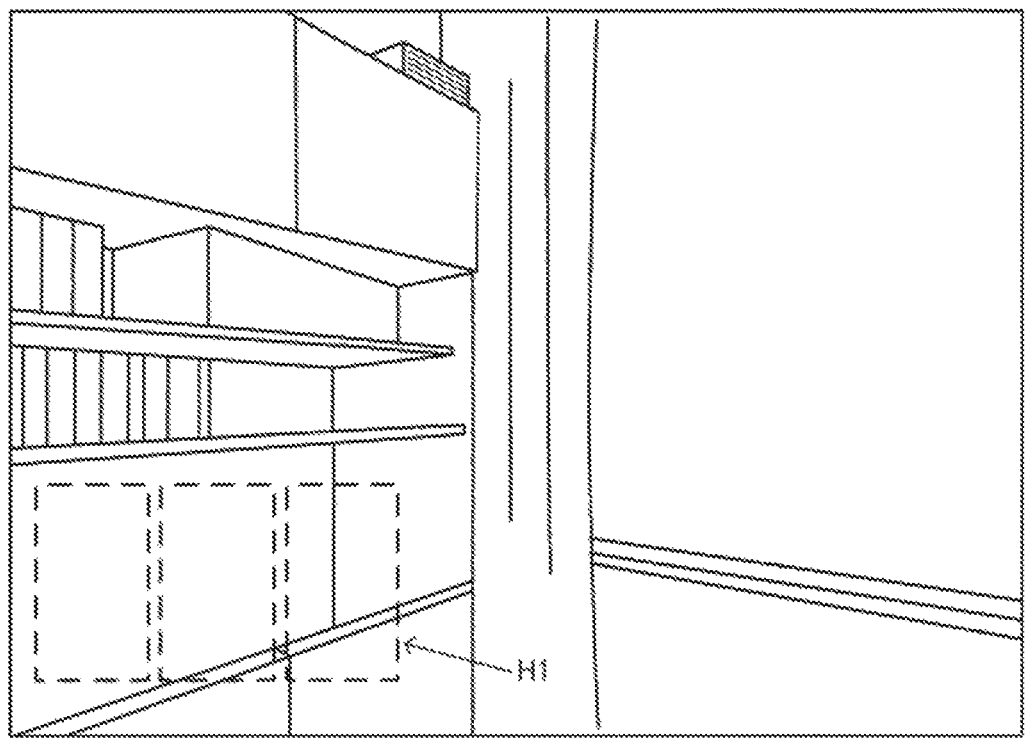
FIG. 22 is a view illustrating a method that does not display an icon that corresponds to a command when a character is not situated within a field-of-view range of a player.

In FIG. 22, the character CH that can be observed in FIGS. 21A and 21B is not situated within the field-of-view range of the player. Specifically, the character CH is not displayed within the display screen.

In this case, the icons IC1, IC2, and IC3 (that are displayed in FIGS. 21A and 21B) are not displayed as indicated by H1 in FIG. 22. Specifically, the icons IC1, IC2, and IC3 are deleted from the display screen.

FIG. 22 illustrates an example in which the player approaches the bookshelf in order to find the book requested by the character CH. In this case, if the icons IC1, IC2, and IC3 are displayed within the screen, it is difficult for the player to find the desired book since the field of view of the player is blocked by the icons IC1, IC2, and IC3.

Since the icons IC1, IC2, and IC3 are used to implement the effect of the command for communicating with the character CH, the necessity for the icons IC1, IC2, and IC3 is low in the situation illustrated in FIG. 22. Therefore, the icons IC1, IC2, and IC3 that block the field of view of the player are not displayed in such a situation. This makes it possible to allow the player to be sufficiently involved in the game, for example.

2.6 Processing Example

Figure 23:
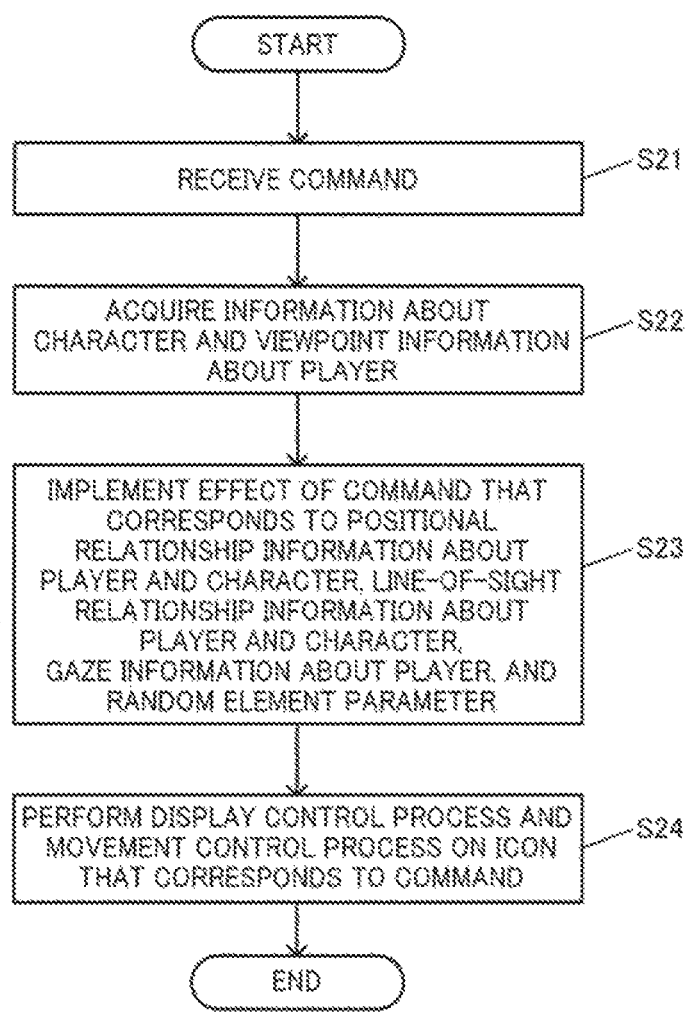
FIG. 23 is a flowchart illustrating a process according to one embodiment of the invention.

A processing example according to one embodiment of the invention is described below using a flowchart illustrated in FIG. 23.

The command reception process is performed (step S21). For example, when a deck has been formed using a plurality of commands (see FIG. 4), and the player has selected the desired command from the plurality of commands included in the deck, the command reception process that receives the selected command is performed.

The information about the character and the viewpoint information about the player are then acquired (step S22). Specifically, the information about the character such as the position, the direction (e.g., line-of-sight direction or facing direction), or the game parameter of the character, and the information about the player such as the viewpoint position, the line-of-sight direction, or the virtual camera attribute of the player are acquired. For example, the information about the character and the viewpoint information about the player are acquired based on the detection signal from the motion sensor 200 of the HMD 200, the imaging section 150, or the operation section 160, data read from the storage section 170, and the like.

The process that implements the effect of the command that corresponds to the positional relationship information about the player and the character, the line-of-sight relationship information about the player and the character, the gaze information about the player, and the random element parameter, is performed (step S23). Specifically, the degree of the effect of the command or the contents of the effect of the command are changed corresponding to the above information. More specifically, the process described above with reference to FIGS. 7A to 15B is performed, for example. The display control process and the movement control process are performed on the icon that corresponds to the command (step S24). Specifically, various icon control processes (e.g., icon display control process and movement control process) described above with reference to FIGS. 16A to 19B are performed.

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of this invention. Any term cited with a different term having a broader meaning or the same meaning at least once in the specification and the drawings can be replaced by the different term in any place in the specification and the drawings. The command reception process, the process that implements the effect of the command, the game process, the icon display control process, the icon movement control process, and the like are not limited to those described in connection with the above embodiments. Methods and processes equivalent to those described above are also included within the scope of the invention. The invention may be applied to various games. The invention may be applied to various game devices such as an arcade game system, a consumer game system, a large-scale attraction system in which a number of players participate, a simulator, a multimedia terminal, a system board that generates a game image, and a mobile phone. For example, the game device may be a mobile phone or a portable information terminal in which a game program is installed and executed.

What is claimed is:

1. An image generation device comprising:
a processor comprising hardware, the processor being configured to implement:
  a reception process that receives a command that has been selected by a player from a plurality of commands;
  a game process that implements an effect of the received command, including:
    determining character information about a character in a game space that is a virtual three-dimensional space, the character being a target of game play performed by the player, and the character information including at least one of position information and direction information of the character in the game space,
    determining viewpoint information about the player including at least one of viewpoint position information and line-of-sight direction information of the player in the game space,
    determining a distance and a line-of-sight between the character and the player based on: (i) the character information about the character that is the target of game play performed by the player, and (ii) the viewpoint information about the player, and
    determining the effect of the received command based on the determined distance or line-of-sight between the character and the player; and
  a display process that displays a game image based on results of the game process, the game image being an image viewed from a viewpoint of the player in the game space.

2. The image generation device as defined in claim 1, wherein the processor implements the game process that includes a process that implements the effect of the command that corresponds to positional relationship information about the player and the character in the game space.

3. The image generation device as defined in claim 1,
wherein the processor implements the game process that includes a process that implements the effect of the command that corresponds to line-of-sight relationship information, the line-of-sight relationship information representing a relationship between a line of sight of the player and the character in the game space.

4. The image generation device as defined in claim 1,
wherein the processor implements the game process that includes a process that implements the effect of the command that corresponds to gaze information about the player.

5. The image generation device as defined in claim 4,
wherein the processor implements the game process that includes a process that implements the effect of the command that corresponds to the gaze information that is at least one of gaze target part information, gaze presence/absence information, gaze time information, and gaze distance information, the gaze target part information being information about a part of the character at which the player gazes, the gaze presence/absence information being information that represents whether or not the player gazes at the character, the gaze time information representing a time in which the player gazes at the character, and the gaze distance information representing a distance between the player and the character when the player gazes at the character.

6. The image generation device as defined in claim 1,
wherein the information about the character is at least one of the position information, the direction information, game parameter information, part information, pose information, and type information about the character, and the viewpoint information is at least one of the viewpoint position information, the line-of-sight direction information, and virtual camera attribute information about the player.

7. The image generation device as defined in claim 1,
wherein the processor implements the game process that includes a process that changes at least one of a degree of the effect of the command and contents of the effect of the command corresponding to the information about the character and the viewpoint information about the player.

8. The image generation device as defined in claim 1,
wherein the processor implements the game process that includes a process that implements an effect of a command that differs from the command selected by the player, corresponding to the information about the character and the viewpoint information about the player.

9. The image generation device as defined in claim 1,
wherein the processor implements the game process that includes a process that changes the effect of the command that has been implemented, when the information about the character or the viewpoint information about the player has changed within a given period after the implementation of the effect of the command corresponding to the information about the character and the viewpoint information about the player.

10. The image generation device as defined in claim 1,
wherein the processor implements the game process that includes a process that implements the effect of the command based on the information about the character, the viewpoint information about the player, and a random element parameter.

11. The image generation device as defined in claim 1,
wherein the processor implements the display process that includes a process that displays an icon that corresponds to the command, and changes a display state of the icon that corresponds to the command when at least one of a degree of the effect of the command and contents of the effect of the command has changed.

12. The image generation device as defined in claim 1,
wherein the processor implements the display process that includes a process that displays an icon that corresponds to the command, and
the processor implements the game process that includes a process that controls movement of the icon corresponding to at least one of the information about the character and the viewpoint information about the player.

13. The image generation device as defined in claim 1,
wherein the processor implements the display process that includes a process that displays a plurality of icons that respectively correspond to a plurality of commands, and
the processor implements the game process that includes a process that performs a first movement control process on an icon among the plurality of icons that corresponds to a first type, and performs a second movement control process on an icon among the plurality of icons that corresponds to a second type, the second movement control process differing from the first movement control process.

14. The image generation device as defined in claim 1,
wherein the processor implements the display process that includes a process that displays a plurality of icons that respectively correspond to a plurality of commands, and
the processor implements the game process that includes a process that performs different movement control processes on a first icon, a second icon, or a third icon and an icon other than the first to third icons, the first icon corresponding to the command of which the effect is being implemented, the second icon corresponding to the command of which the effect has changed, the third icon relating to a game parameter of the character.

15. The image generation device as defined in claim 1,
wherein the processor implements the display process that includes a process that displays an icon so that the icon that corresponds to the command is displayed at a specific position within a display screen even when the viewpoint information about the player has changed.

16. The image generation device as defined in claim 15,
wherein the processor implements the display process that includes a process that does not display the icon that corresponds to the command when it is determined that the character is not situated within a field-of-view range of the player.

17. An image generation device comprising:
a processor comprising hardware, the processor being configured to implement:
  a reception process that receives a command that has been selected by a player using a touch panel operation from a plurality of commands;
  a game process that implements an effect of the received command, including:
    determining character information about a character in a game space that is a virtual three-dimensional space, the character being a target of game play performed by the player, and the character information including at least one of position information and direction information of the character in the game space, determining viewpoint information about the player including at least one of viewpoint position information and line-of-sight direction information of the player in the game space, determining a distance and a line-of-sight between the character and the player based on: (i) the character information about the character that is the target of game play performed by the player, and (ii) the viewpoint information about the player, and determining the effect of the received command based on the determined distance or line-of-sight between the character and the player; and a display process that displays a game image based on results of the game process, the game image being an image viewed from a viewpoint of the player in the game space.

18. An image generation device comprising:

a processor comprising hardware, and a head-mounted display, the processor being configured to implement:

a reception process that receives a command that has been selected by a player from a plurality of commands;

a game process that implements an effect of the received command, including:

determining character information about a character in a game space that is a virtual three-dimensional space, the character being a target of game play performed by the player, and the character information including at least one of position information and direction information of the character in the game space, determining viewpoint information about the player including at least one of viewpoint position information and line-of-sight direction information of the player in the game space, determining a distance and a line-of-sight between the character and the player based on: (i) the character information about the character that is the target of game play performed by the player, and (ii) the viewpoint information about the player, and determining the effect of the received command based on the determined distance or line-of-sight between the character and the player; and a display process that displays a game image based on results of the game process, the game image being displayed on the head-mounted display, the game image being an image viewed from a viewpoint of the player in the game space.

19. An image generation method comprising:

performing a reception process that receives a command that has been selected by a player from a plurality of commands;

performing a game process that implements an effect of the received command, including:

determining character information about a character in a game space that is a virtual three-dimensional space, the character being a target of game play performed by the player, and the character information including at least one of position information and direction information of the character in the game space, determining viewpoint information about the player including at least one of viewpoint position information and line-of-sight direction information of the player in the game space, determining a distance and a line-of-sight between the character and the player based on: (i) the character information about the character that is the target of game play performed by the player, and (ii) the viewpoint information about the player, and determining the effect of the received command based on the determined distance or line-of-sight between the character and the player; and performing a display process that displays a game image based on results of the game process, the game image being an image viewed from a viewpoint of the player in the game space.

20. An image generation method comprising:

performing a reception process that receives a command that has been selected by a player using a touch panel operation from a plurality of commands;

performing a game process that implements an effect of the received command, including:

determining character information about a character in a game space that is a virtual three-dimensional space, the character being a target of game play performed by the player, and the character information including at least one of position information and direction information of the character in the game space, determining viewpoint information about the player including at least one of viewpoint position information and line-of-sight direction information of the player in the game space, determining a distance and a line-of-sight between the character and the player based on: (i) the character information about the character that is the target of game play performed by the player, and (ii) the viewpoint information about the player, and determining the effect of the received command based on the determined distance or line-of-sight between the character and the player; and performing a display process that displays a game image based on results of the game process, the game image being an image viewed from a viewpoint of the player in the game space.

* * * * *